US012641677B2

(12) United States Patent
Yi et al.

(10) Patent No.: US 12,641,677 B2
(45) Date of Patent: May 26, 2026

(54) METHOD AND DEVICE FOR SUPPORTING ENERGY SAVING IN WIRELESS COMMUNICATION SYSTEM

(71) Applicant: Samsung Electronics Co., Ltd., Gyeonggi-do (KR)

(72) Inventors: Junyung Yi, Gyeonggi-do (KR); Youngbum Kim, Gyeonggi-do (KR); Hyunseok Ryu, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 18/487,454

(22) Filed: Oct. 16, 2023

(65) Prior Publication Data

US 2024/0138022 A1      Apr. 25, 2024

(30) Foreign Application Priority Data

Oct. 14, 2022      (KR) ......................... 10-2022-0132579

(51) Int. Cl.
*H04W 76/28*          (2018.01)
*H04W 52/02*          (2009.01)
(52) U.S. Cl.
CPC ....... *H04W 76/28* (2018.02); *H04W 52/0206* (2013.01)
(58) Field of Classification Search
CPC .......................... H04W 76/28; H04W 52/0206
See application file for complete search history.

(56) References Cited

U.S. PATENT DOCUMENTS

| | | | |
|---|---|---|---|
| 10,070,478 B2 | 9/2018 | He et al. | |
| 10,225,829 B2 * | 3/2019 | Vos ....................... | H04L 1/1822 |
| 2007/0133479 A1 | 6/2007 | Montojo et al. | |
| 2012/0115471 A1 | 5/2012 | Awoniyi et al. | |
| 2015/0029920 A1 | 1/2015 | Hoehne et al. | |
| 2021/0045146 A1 | 2/2021 | Beale et al. | |
| 2021/0176814 A1 | 6/2021 | Shi | |
| 2024/0114460 A1 | 4/2024 | Yi et al. | |
| 2025/0280466 A1 * | 9/2025 | Zhou ................. | H04W 52/0206 |

FOREIGN PATENT DOCUMENTS

| | | |
|---|---|---|
| KR | 1020240041641 | 4/2024 |
| WO | WO 2022/080888 | 4/2022 |

OTHER PUBLICATIONS

International Search Report dated Jan. 24, 2024 issued in counterpart application No. PCT/KR2023/015957, 8 pages.
European Search Report dated Sep. 2, 2025 issued in counterpart application No. 23877776.7-1206, 10 pages.

* cited by examiner

*Primary Examiner* — Gbemileke J Onamuti
(74) *Attorney, Agent, or Firm* — The Farrell Law Firm, P.C.

(57) ABSTRACT

The disclosure relates to a 5G communication system or a 6G communication system for supporting higher data rates beyond a 4G communication system such as LTE. A method performed by a BS in a wireless communication system includes transmitting, to a UE, via an RRC signaling, first information configuring a DTX for an energy saving of the base station; transmitting, to the UE, DCI indicating an activation or deactivation of the DTX; and transmitting, to the UE, a downlink signal based on the activation or deactivation of the DTX.

8 Claims, 19 Drawing Sheets

DRX alignment for NWES (1201)

Independent DMRS
channel estimation

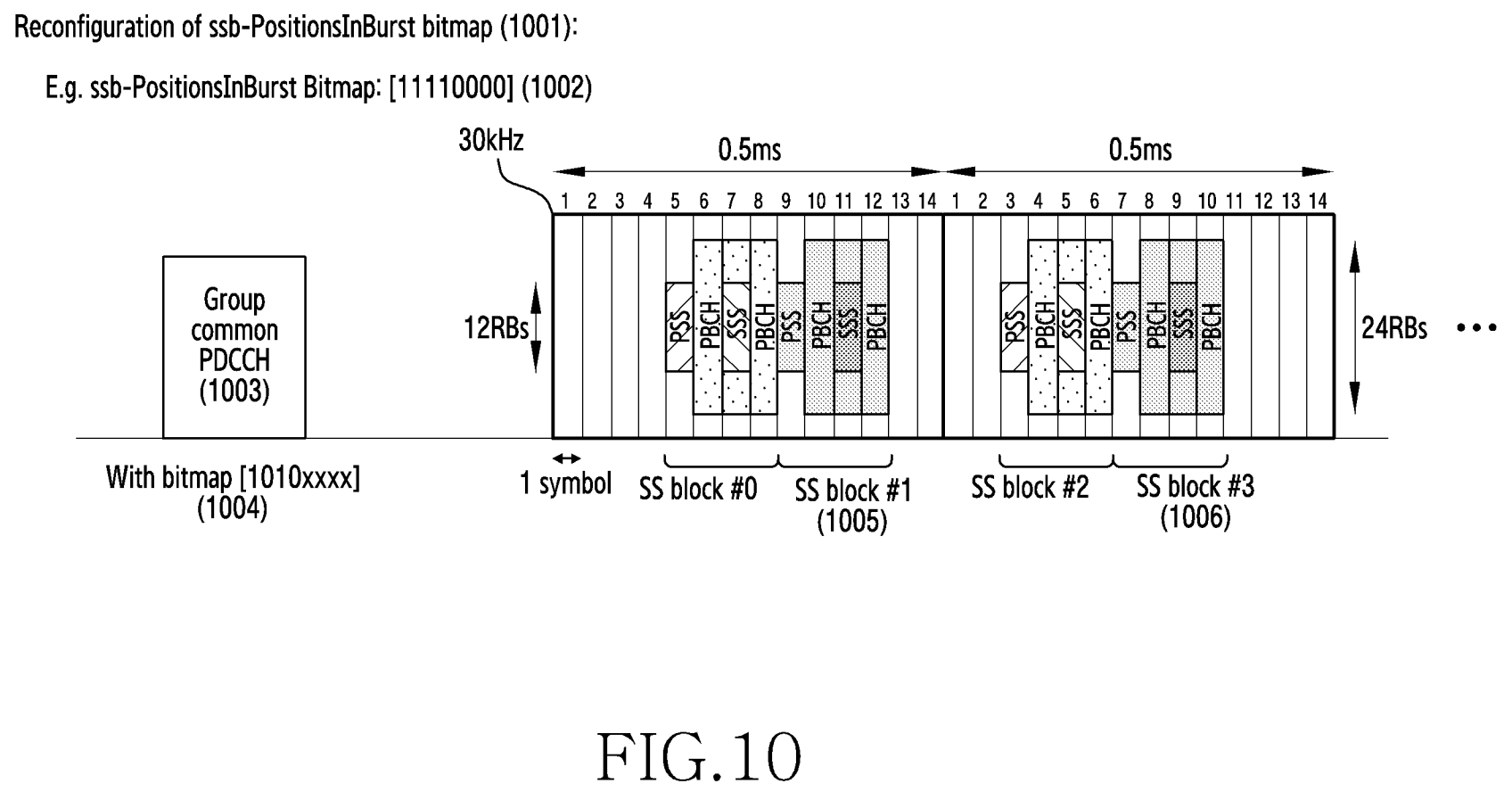

Reconfiguration of ssb-PositionsInBurst bitmap (1001):

E.g. ssb-PositionsInBurst Bitmap: [11110000] (1002)

24RBs 0.5ms 0.5ms

30kHz

12RBs 1 symbol

SS block #0

SS block #1
(1005)

SS block #2

SS block #3
(1006)

Group common PDCCH (1003)

With bitmap [1010xxxx] (1004)

FIG.10

TxRU adaptation for NWES (1301)

Normal mode with 64 TxRUs

TxRU Adaptation

NWES mode with 32 TxRUs gNB gNB

Concept of gNB wake-up signal (1401)

Discontinuous transmission (DTx) (1501)

START

1601
RECEIVE DTX CONFIGURATION INFORMATION VIA
HIGHER-LAYER SIGNALING (RRC, SIB)

1602
RECEIVE DTX ACTIVATION AND INACTIVATION
CONFIGURATION INFORMATION VIA DCI OR
MAC CE SIGNAL

1603
PERFORM DTX OPERATION AFTHER
SYNCHRONIZATION ACCORDING TO RECEIVED
INDICATION

END

METHOD AND DEVICE FOR SUPPORTING ENERGY SAVING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0132579, which was filed in the Korean Intellectual Property Office on Oct. 14, 2022, the entire disclosure of which is herein incorporated by reference.

BACKGROUND

1. Field

The disclosure relates generally to a wireless communication system and, more particularly, to a method and a device supporting energy saving in a wireless communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system. The 5G or pre-5G communication system may also be referred to as a 'beyond 4G network' or a 'post long term evolution (LTE) system'.

The 5G communication system is expected to be implemented in higher frequency (mmWave) bands, e.g., 28 GHz or 60 GHz bands, to accomplish higher data rates. To decrease propagation loss of the radio waves and increase transmission distance, beamforming, massive multiple-input multiple-output (MIMO), full dimensional MIMO (FD-MIMO), array antennas, analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In the 5G system, hybrid frequency shift keying (FSK) and quadrature amplitude modulation (QAM) (FQAM) and sliding window superposition coding (SWSC) have been developed as for advanced coding modulation (ACM), and filter bank multi carrier (FBMC), non-orthogonal multiple access (NOMA), and sparse code multiple access (SCMA) have been developed as advanced access technologies.

The Internet is evolving from a human-centered network of connections where humans create and consume information to an Internet of things (IoT) network where information is exchanged and processed among distributed components, i.e., things, such as objects. Internet of everything (IoE) technology, which combines IoT technology with big data processing technology through connections to cloud servers, is also emerging.

To realize IoT, technology elements such as sensing technology, wired and wireless communication and network infrastructure, service interface technology, and security technology are required, and recently, technologies such as a sensor network, machine to machine (M2M), and machine type communication (MTC) have been researched for connecting things. In an IoT environment, intelligent Internet technology (IT) services that can be provided by collecting and analyzing data generated by connected objects. IoT can be applied to various fields such as smart homes, smart buildings, smart cities, smart or connected cars, smart grids, healthcare, smart appliances, and advanced medical services through convergence and complexity between existing information technology and various industries.

Various attempts are being made to apply 5G communication systems to IoT networks. For example, technologies such as a sensor network, M2M, and MTC are being implemented by 5G communication technologies such as beamforming, MIMO, and array antennas. The application of cloud RAN as a big data processing technology is also an example of the convergence of 5G and IoT technologies.

Considering the development of wireless communication from generation to generation, the technologies have been developed mainly for services targeting humans, such as voice calls, multimedia services, and data services. However, following the commercialization of 5G communication systems, it is expected that the number of connected devices will exponentially grow. Increasingly, these devices will be connected to communication networks. Examples of connected devices may include vehicles, robots, drones, home appliances, displays, smart sensors connected to various infrastructures, construction machines, and factory equipment.

Mobile devices are also expected to evolve in various form-factors, such as augmented reality (AR) glasses, virtual reality (VR) headsets, and hologram devices.

In order to provide various services by connecting hundreds of billions of devices and things in a 6th generation (6G) era, there are also ongoing efforts to develop improved 6G communication systems. 6G communication systems may be referred to as beyond-5G systems.

6G communication systems, which are expected to be commercialized around 2030, will have a peak data rate of tera (1,000 giga)-level bit per second (bps) and a radio latency less than 100 μsec, and thus, will be about 50 times as fast as 5G communication systems and have the 1/10 radio latency thereof.

In order to accomplish such a high data rate and an ultra-low latency, it has been considered to implement 6G communication systems in a terahertz (THz) band (e.g., 95 gigahertz (GHz) to 3 THz bands). It is expected that, due to severer path loss and atmospheric absorption in the THz bands than those in mmWave bands introduced in 5G, technologies capable of securing the signal transmission distance (i.e., coverage) will become more crucial. Accordingly, to secure the appropriate coverage, it is expected that it will be necessary to develop radio frequency (RF) elements, antennas, novel waveforms having a better coverage than orthogonal frequency division multiplexing (OFDM), beamforming and massive MIMO, FD-MIMO, array antennas, and multiantenna transmission technologies such as large-scale antennas. In addition, there is ongoing discussion on new technologies for improving the coverage of THz-band signals, such as metamaterial-based lenses and antennas, orbital angular momentum (OAM), and reconfigurable intelligent surface (RIS).

In order to improve the spectral efficiency and the overall network performances, the following technologies have been developed for 6G communication systems: a full-duplex technology for enabling an uplink (UL) transmission and a downlink (DL) transmission to simultaneously use the same frequency resource; a network technology for utilizing satellites, high-altitude platform stations (HAPS), etc., in an integrated manner; an improved network structure for supporting mobile base stations (BSs) and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of user equipment (UE) computing ability through reachable super-high-performance communication and computing resources (such as mobile edge computing (MEC), clouds, etc.) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as M2M, will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

With the recent development of 5G/6G communication systems in consideration of the environment, there is also a need for a method to reduce energy consumption of BS s.

SUMMARY

The present disclosure has been made to address at least the disadvantages described above and to provide at least the advantages described below.

An aspect of the disclosure is to provide a discontinuous transmission (DTX) method for reducing energy consumption of a BS in a wireless communication system.

Another aspect of the disclosure is to provide a DTX pattern for energy saving of a BS, wherein DTX information is configured via higher-layer signaling (e.g., radio resource control (RRC) or a system information block (SIB)), and a DTX operation for energy saving of the BS is initiated based on DTX activation via higher-layer signaling and layer 1 (L1) signaling.

In accordance with an aspect of the disclosure, a method performed by a BS in a wireless communication system is provided. The method includes transmitting, to a UE, via an RRC signaling, first information configuring a DTX for an energy saving of the base station; transmitting, to the UE, DL control information (DCI) indicating an activation or deactivation of the DTX; and transmitting, to the UE, a downlink signal based on the activation or deactivation of the DTX.

In accordance with another aspect of the disclosure, a method performed by a UE is provided. The method includes receiving, from a base station, via an RRC signaling, first information configuring a DTX for an energy saving of the base station; receiving, from the base station, DCI indicating an activation or deactivation of the DTX; and receiving, from the base station, a downlink signal according to the activation or deactivation of the DTX.

In accordance with another aspect of the disclosure, a BS is provided for use in a wireless communication system. The BS includes a transceiver; and a controller coupled with the transceiver, and configured to transmit, to a UE, via an RRC signaling, first information configuring a DTX for an energy saving of the base station, transmit, to the UE, DCI indicating an activation or deactivation of the DTX, and transmit, to the UE, a downlink signal based on the activation or deactivation of the DTX.

In accordance with another aspect of the disclosure, a UE is provided for use in a wireless communication system. The UE includes a transceiver; and a controller coupled with the transceiver, and configured to receive, from a base station, via an RRC signaling, first information configuring a DTX for an energy saving of the base station, receive, from the base station, DCI indicating an activation or deactivation of the DTX, and receive, from the base station, a downlink signal according to the activation or deactivation of the DTX.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates a method of reconfiguring an SSB transmission via dynamic signaling, according to an embodiment;

DETAILED DESCRIPTION

Figure 1:
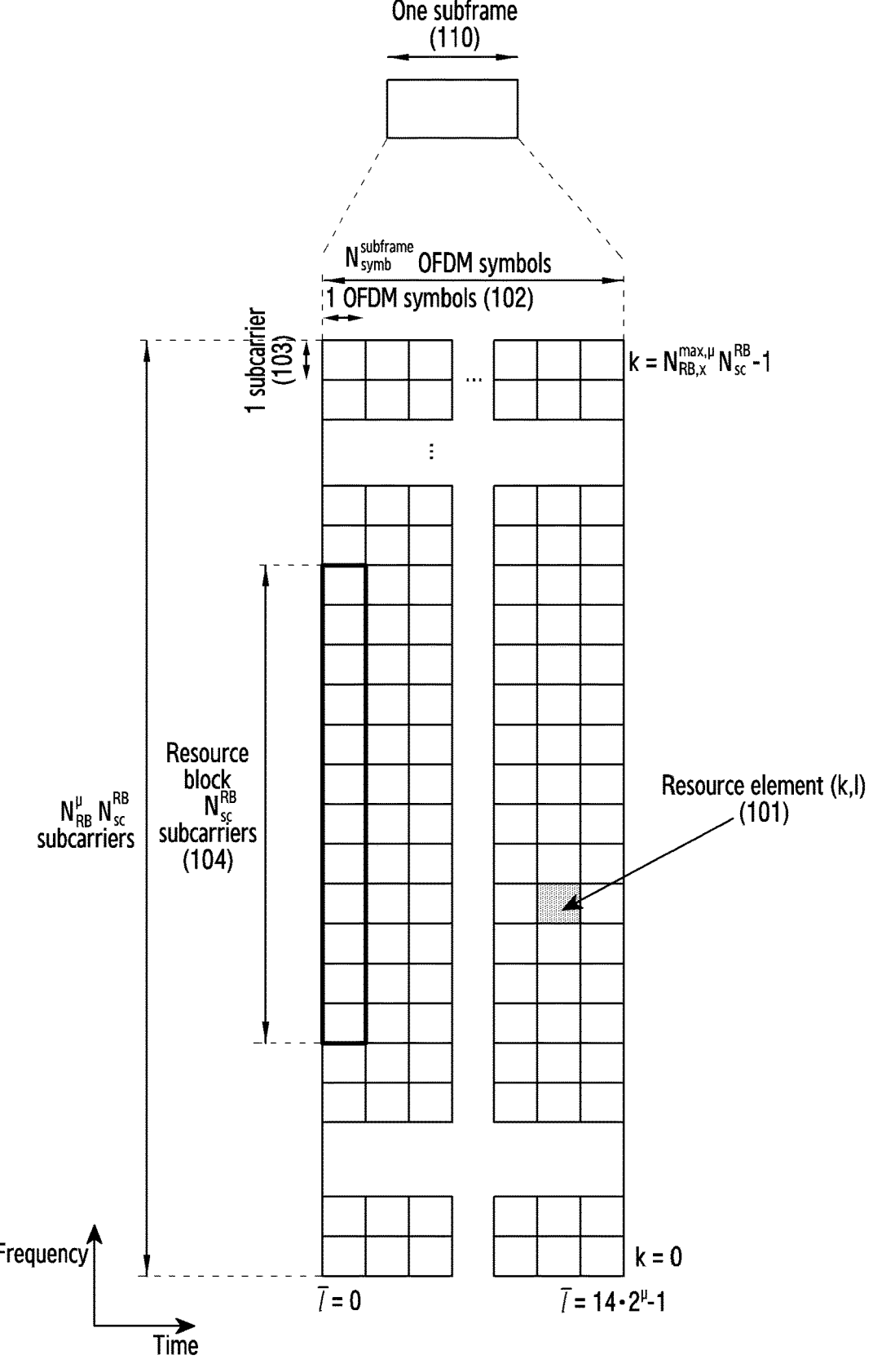
FIG. 1 illustrates a time-frequency domain in a wireless communication system, according to an embodiment.

Hereinafter, various embodiments of the disclosure will be described in detail with reference to the accompanying drawings. In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For similar reasoning, in the accompanying drawings, some elements may be exaggerated, omitted, or schematically illustrated. As such, the size of each element does not completely reflect the actual size. In the drawings, identical or corresponding elements may be provided with identical reference numerals.

Advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a wireless access unit, a BS controller, and a node on a network. A terminal may include a UE, a mobile station (MS), a cellular phone, a smartphone, a computer, or a multimedia system capable of performing communication functions. In the disclosure, a DL refers to a radio link via which a BS transmits a signal to a terminal, and a UL refers to a radio link via which a terminal transmits a signal to a BS.

In the following description, while LTE or LTE-advanced (LTE-A) systems may be described by way of example, the embodiments of the disclosure may also be applied to other communication systems having similar technical backgrounds or channel types. Examples of such communication systems may include 5G mobile communication technologies (e.g., new radio (NR)) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Each block of the flowcharts, and combinations of blocks in the flowcharts, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowcharts may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, a "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, the "unit" includes, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in a embodiments may include one or more processors.

Hereinafter, a method and a device proposed in embodiments of the disclosure provide descriptions as examples for improving UL coverage when performing a random-access procedure, but are not limited to each of the embodiments, and can be utilized for a method for configuring a frequency resource corresponding to another channel by using a combination of all or some of one or more embodiments proposed in the disclosure. Accordingly, the embodiments of the disclosure may be applied via some modifications within a range that does not significantly deviate from the scope of the disclosure, according to a determination made by a person skilled in the art.

The terms which will be described below are terms defined in consideration of the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of $3^{rd}$ generation partnership project (3GPP), LTE, evolved universal terrestrial radio access (E-UTRA), LTE-A, LTE-Pro, high-rate packet data (HRPD) of 3GPP2, ultra-mobile broadband (UMB), IEEE 802.17e, etc., as well as typical voice-based services.

As an example of a broadband wireless communication system, an LTE system employs an OFDM scheme in a DL and employs a single carrier frequency division multiple access (SC-FDMA) scheme in a UL. The UL indicates a radio link through which a UE (or an MS) transmits data or control signals to a BS (or eNode B), and the DL indicates a radio link through which the BS transmits data or control signals to the UE. The above multiple access scheme may be operated to separate data or control information of respective users by allocating and operating time-frequency resources for transmitting the data or control information for each user so as to avoid overlapping each other, i.e., so as to establish orthogonality.

Since a 5G communication system, which is a post-LTE communication system, should freely reflect various requirements of users, service providers, etc., services satisfying various requirements should be supported. The services considered in the 5G communication system include enhanced mobile broadband (eMBB) communication, massive MTC (mMTC), ultra-reliability low-latency communication (URLLC), etc.

eMBB aims at providing a higher data rate than that supported by existing LTE, LTE-A, or LTE-Pro. For example, in a 5G communication system, eMBB should provide a peak data rate of 20 Gbps in the DL and a peak data rate of 10 Gbps in the UL for a single BS. Furthermore, the 5G communication system should provide an increased user-perceived data rate to the UE, as well as the maximum data rate. In order to satisfy such requirements, transmission/reception technologies including a further enhanced MIMO transmission techniques are required to be improved. In addition, the data rate required for the 5G communication system may be obtained using a frequency BW more than 20 MHz in a frequency band of 3 to 6 GHz or 6 GHz or more, instead of transmitting signals using a transmission BW up to 20 MHz in a band of 2 GHz used in LTE.

In addition, mMTC is being considered to support application services such as the IoT in the 5G communication system. mMTC has requirements, such as support of connection of a large number of UEs in a cell, enhancement coverage of UEs, improved battery time, a reduction in the cost of a UE, etc., in order to effectively provide the IoT. Since the IoT provides communication functions while being provided to various sensors and various devices, it should support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC should also be configured to be inexpensive, and have a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, etc. URLLC should provide communication with ultra-low latency and ultra-high reliability. For example, a service supporting URLLC should satisfy an air interface latency of less than 0.5 ms, and also requires a packet error rate of 10-5 or less. Therefore, for the services supporting URLLC, a 5G system should provide a transmit time interval (TTI) shorter than those of other services, and should also assign a large number of resources in a frequency band in order to secure reliability of a communication link.

These three services in the 5G communication system (or "5G system"), i.e., eMBB, URLLC, and mMTC, may be multiplexed and transmitted in a single system. In order to satisfy different requirements of the respective services, different transmission/reception techniques and transmission/reception parameters may be used between the services.

Hereinafter, a wireless communication system to which the disclosure is applied will be described using a 5G system configuration as an example for convenience of explanation, but embodiments of the disclosure may also be applied in the same or similar manner to 5G or higher systems or other communication systems to which the disclosure is applicable.

FIG. 1 illustrates a time-frequency domain in a wireless communication system, according to an embodiment.

Referring to FIG. 1, a horizontal axis represents a time domain, and a vertical axis represents a frequency domain. A basic unit of resources in time and frequency domains is a resource element (RE) 101 and may be defined to be 1 OFDM symbol (or discrete Fourier transform spread OFDM (DFT-s-OFDM) symbol) 102 on the time axis and 1 sub-carrier 103 on the frequency axis. In the frequency domain, $$N_{SC}^{RB}$$

(e.g., 12) consecutive REs representing the number of sub-carriers per resource block (RB) may constitute one RB 104. In addition, in the time domain, $$N_{symb}^{subframe}$$

consecutive OFDM symbols representing the number of symbols per subframe may constitute one subframe 110.

Figure 2:
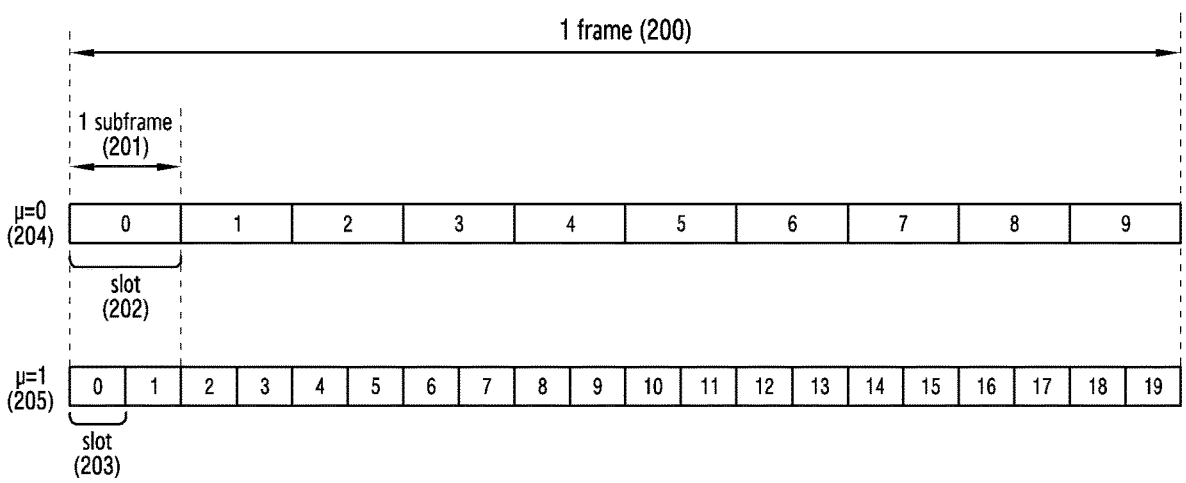
FIG. 2 illustrates a slot structure in a wireless communication system, according to an embodiment.

FIG. 2 illustrates a slot structure in a wireless communication system, according to an embodiment.

Referring to FIG. 2, an example of a slot structure including a frame 200, a subframe 201, and a slot 202 or 203 is illustrated. One frame 200 may be defined to be 10 ms. One subframe 201 may be defined to be 1 ms, and therefore, one frame 200 may include a total of 10 subframes 201. One slot 202 or 203 may be defined to be 14 OFDM symbols (e.g., the number $$\left(N_{symb}^{slot}\right)$$

of symbols per slot=14). One subframe 201 may include one or multiple slots 202 or 203, and the number of slots 202 or 203 per subframe 201 may vary according to μ 204 and 205, i.e., a configuration value for SCS.

A slot structure for μ=0 204 and a slot structure for μ=1 205 are illustrated, where μ is a SCS configuration value. For μ=0 204, one subframe 201 may include one slot 202, and for μ=1 205, one subframe 201 may include two slots (e.g., including the slot 203). The number $$\left(N_{slot}^{subframe,\mu}\right)$$

of slots per subframe may vary according to configuration value μ for a SCS, and accordingly, the number $$\left(N_{slot}^{frame,\mu}\right)$$

of slots per frame may vary. For example, $$N_{slot}^{subframe,\mu} \text{ and } N_{slot}^{frame,\mu}$$

according to each SCS configuration μ may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

In the 5G wireless communication system, a BS may transmit, to a terminal, an SSB (which may be interchangeably used with an SS block or an SS/PBCH block) for initial access of the terminal. The SSB may include a primary SS (PSS), a secondary SS (SSS), and a physical broadcast channel (PBCH).

During initial access for the terminal to access a network, the terminal may first acquire DL time and frequency domain synchronization from an SS via a cell search and may acquire a cell identifier (ID). The SS may include a PSS and an SSS. The terminal may receive, from the BS, a PBCH including a master information block (MIB) in order to acquire a basic parameter value and system information related to transmission or reception, such as a system BW or relative control information. Based on the received information, the terminal may decode a physical DL control channel (PDCCH) and a physical DL shared channel (PDSCH) so as to acquire an SIB. The terminal may exchange terminal identification-related information with the BS via random access, and may initially access the network via registration and authentication. Additionally, the terminal may receive system information (e.g., an SIB) transmitted by the BS, so as to acquire control information related to cell common transmission or reception. The cell common transmission or reception-related control information may include random-access-related control information, paging-related control information, and common control information for various physical channels.

The SS may be a signal that serves as a reference for a cell search, and an SCS may be applied to the SS so as to be suitable for a channel environment, such as phase noise, for each frequency band. For a data channel or a control channel, in order to support various services, a SCS may be applied differently depending on a service type.

Figure 3:
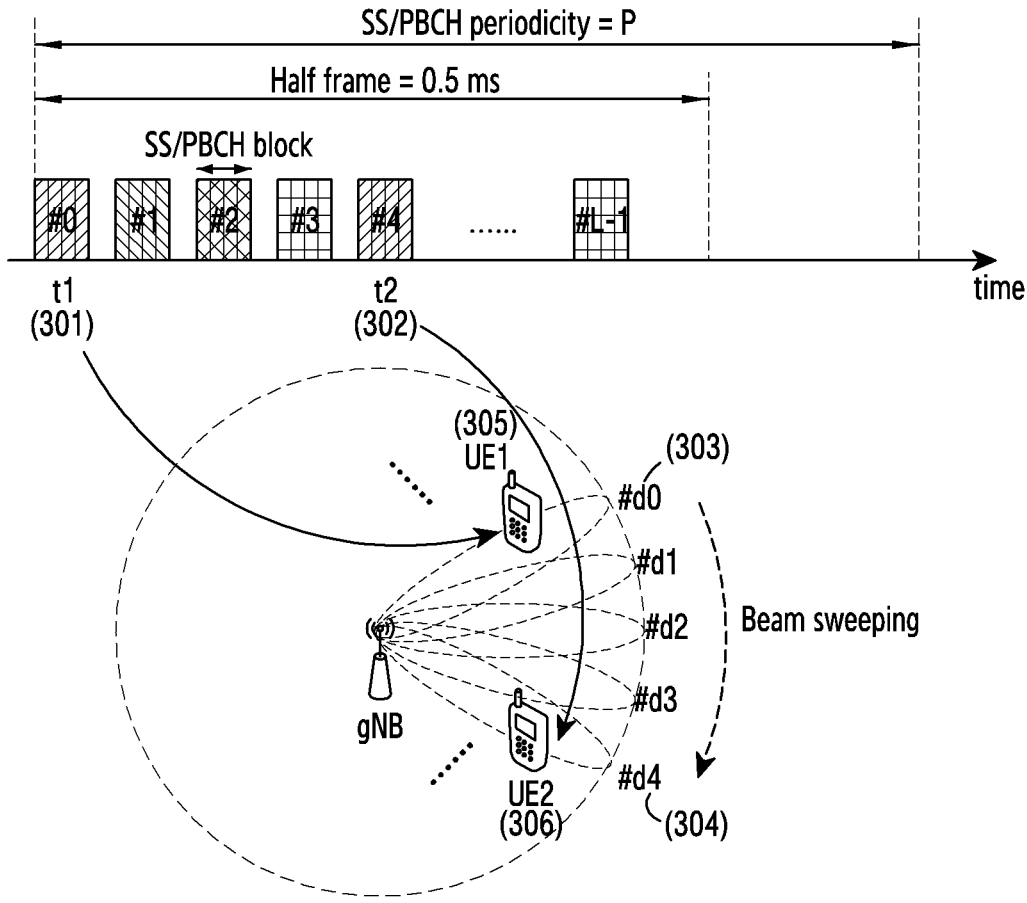
FIG. 3 illustrates a beam sweeping operation and a time domain mapping structure of a synchronization signal (SS), according to an embodiment.

FIG. 3 illustrates a beam sweeping operation and a time domain mapping structure of an SS, according to an embodiment.

Referring to FIG. 3, the following elements may be defined:

PSS: A PSS is a signal that serves as a reference for DL time/frequency synchronization and may provide some cell ID information.

SSS: An SSS may be a signal that serves as a reference for DL time/frequency synchronization and may provide some of the remaining cell ID information. In addition, the SSS may serve as a reference signal (RS) for demodulation of a PBCH.

PBCH: A PBCH may include an MIB, which is essential system information for transmission or reception of a data channel and a control channel of a terminal. The essential system information may include search space-related control information indicating radio resource mapping information of a control channel, scheduling control information for a separate data channel for transmission of the system information, and information such as a system frame number (SFN), which is a frame unit index that serves as a timing standard.

SS/PBCH block or SSB (SS/PBCH block): An SS/PBCH block may be configured by N OFDM symbols and may include a combination of a PSS, an SSS, a PBCH, etc. For a system to which a beam sweeping technology is applied, an SS/PBCH block may be a minimum unit to which beam sweeping is applied. In a 5G system, N may be 4 (N=4). A BS may transmit up to L SS/PBCH blocks, and the L SS/PBCH blocks may be mapped within a half frame (0.5 ms). The L SS/PBCH blocks may be periodically repeated in units of predetermined periods (P). The BS may inform a terminal of the period (P) via signaling. If there is no separate signaling for the period (P), the terminal may apply a pre-arranged default value.

FIG. 3 illustrates an example in which beam sweeping is applied in units of SS/PBCH blocks over time. For terminal 1 305, an SS/PBCH block may be received using a beam emitted in direction #d0 303, by beamforming applied to SS/PBCH block #0 at time point t1. Terminal 2 306 may receive an SS/PBCH block by using a beam emitted in direction #d4 304, by beamforming applied to SS/PBCH block #4 at time point t2.

A terminal may acquire an optimal SS via a beam emitted in the direction, where the terminal is located, from the BS. For example, it may be difficult for terminal 1 305 to acquire time/frequency synchronization and essential system information from the SS/PBCH block via the beam emitted in direction #d4 which is far from the location of terminal 1.

In addition to an initial access procedure, in order to determine whether a radio link quality of a current cell is maintained at a certain level or higher, the terminal may receive an SS/PBCH block. In addition, during a handover procedure in which the terminal moves access from the current cell to an adjacent cell, the terminal may determine a radio link quality of the adjacent cell and receive an SS/PBCH block of the adjacent cell in order to acquire time/frequency synchronization of the adjacent cell.

An SS is a signal that serves as a reference for a cell search, wherein an SCS appropriate for a channel environment (e.g., phase noise) may be applied for each frequency band, so that the SS may be transmitted. A 5G BS may transmit multiple SSBs according to the number of analog beams to be operated. For example, a PSS and an SSS may be mapped and transmitted over 12 RBs, and a PBCH may be mapped and transmitted over 24 RBs.

Figure 4:
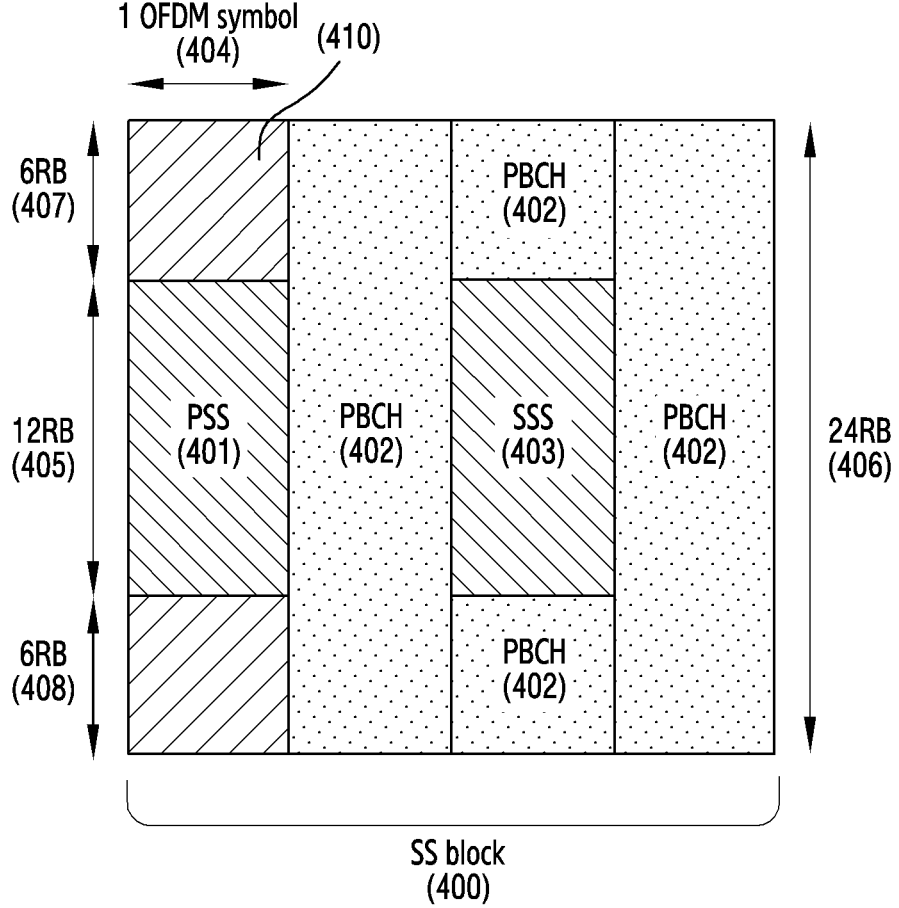
FIG. 4 illustrates an SS block (SSB) considered in a wireless communication system, according to an embodiment.

FIG. 4 illustrates an SSB in a wireless communication system, according to an embodiment.

Referring to FIG. 4, an SSB (or SS block) 400 may include a PSS 401, an SSS 403, and a PBCH 402.

The SSB 400 may be mapped to four OFDM symbols 404 on the time axis. The PSS 401 and the SSS 403 may be transmitted in 12 RBs 405 on the frequency axis and in a first and a third OFDM symbol on the time axis. In the 5G system, e.g., a total of 1008 different cell IDs may be defined. Depending on a physical layer cell ID (or physical cell ID (PCI)) of a cell, the PSS 401 may have 3 different values, and the SSS 403 may have 336 different values. Via detection for the PSS 401 and the SSS 403, based on a combination thereof, a terminal may acquire one of 1008 (336×3=1008) cell IDs, e.g., as expressed by Equation (1).

$$N_{ID}^{cell} = 3N_{ID}^{(1)} + N_{ID}^{(2)} \qquad (1)$$

In Equation (1), $$N_{ID}^{(1)}$$

may be estimated from the SSS 403 and may have a value between 0 and 335.

$$N_{ID}^{(2)}$$

may be estimated from PSS 401 and may have a value between 0 and 2. The terminal may estimate a value of $$N_{ID}^{(cell)},$$

which is a cell ID, by using a combination of $$N_{ID}^{(1)} \text{ and } N_{ID}^{(2)}.$$

In 24 RBs 406 on the frequency axis and in a second to a fourth OFDM symbol of the SS block on the time axis, the PBCH 402 may be transmitted in resources including 6 RBs 407 and 6 RBs 408 on both sides, excluding 12 RBs 405 in the middle where the SSS 403 is transmitted. The PBCH 402 may include a PBCH payload and a PBCH DMRS. The PBCH payload may include various system information, e.g., an MIB. For example, the MIB may include information as shown in Table 2 below.

TABLE 2

| MIB ::= | SEQUENCE { |
| --- | --- |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

SSB information: An offset of the frequency domain of the SSB may be indicated via 4-bit ssb-SubcarrierOffset in an MIB. The terminal may indirectly acquire an index of the SSB including the PBCH via decoding of the PBCH and the PBCH DMRS. In a frequency band below 6 GHz, 3 bits acquired via decoding of the PBCH DMRS may indicate the SSB index, and in a frequency band above 6 GHz, a total of 6 bits, which includes 3 bits acquired via decoding of the PBCH DMRS and 3 bits included in the PBCH payload and acquired from PBCH decoding, may indicate the SSB index including the PBCH.

PDCCH configuration information: Within the MIB, 1 bit (subCarrierSpacingCommon) may be used to indicate a SCS of a common DL control channel, and 8 bits (pdcch-ConfigSIB1) may be used to indicate time-frequency resource configuration information of a control resource set (CORESET) and a search space.

SFN: Within the MIB, 6 bits (systemFrameNumber) may be used to indicate a part of an SFN. 4 bits (e.g., least significant bit (LSB)) of the SFN may be included in the PBCH payload, and the terminal may indirectly acquire the same via PBCH decoding.

Timing information in a radio frame. Timing information in a radio frame may be 1 bit (half frame), which is included in the PBCH payload and the SSB index described above so as to be acquired via PBCH decoding. The terminal may indirectly identify whether the SSB has been transmitted in the first or second half frame of the radio frame.

The aforementioned parameters are merely examples and are not limited thereto, and of course, equal or substantially similar parameters may be further included.

The transmission BW (12 RBs 405) of the PSS 401 and the SSS 403 is different from the transmission BW (24 RBs 406) of the PBCH 402, such that, in the first OFDM symbol, on which the PSS 401 is transmitted, within the transmission bandwidth of the PBCH 402, there may be 6 RBs 407 and 6 RBs 408 on both sides excluding 12 RBs in the middle where the PSS 401 is transmitted. The aforementioned area may be used for transmission of another signal or may be empty.

SSBs may be transmitted using the same analog beam. For example, the PSS 401, the SSS 403, and the PBCH 402 may all be transmitted via the same beam. Since analog beams cannot be applied differently to the frequency axis, the same analog beam may be applied to all frequency axis RBs within a specific OFDM symbol to which a specific analog beam has been applied. For example, the four OFDM symbols on which the PSS 401, the SSS 403, and the PBCH 402 are transmitted may all be transmitted via the same analog beam.

Figure 5:
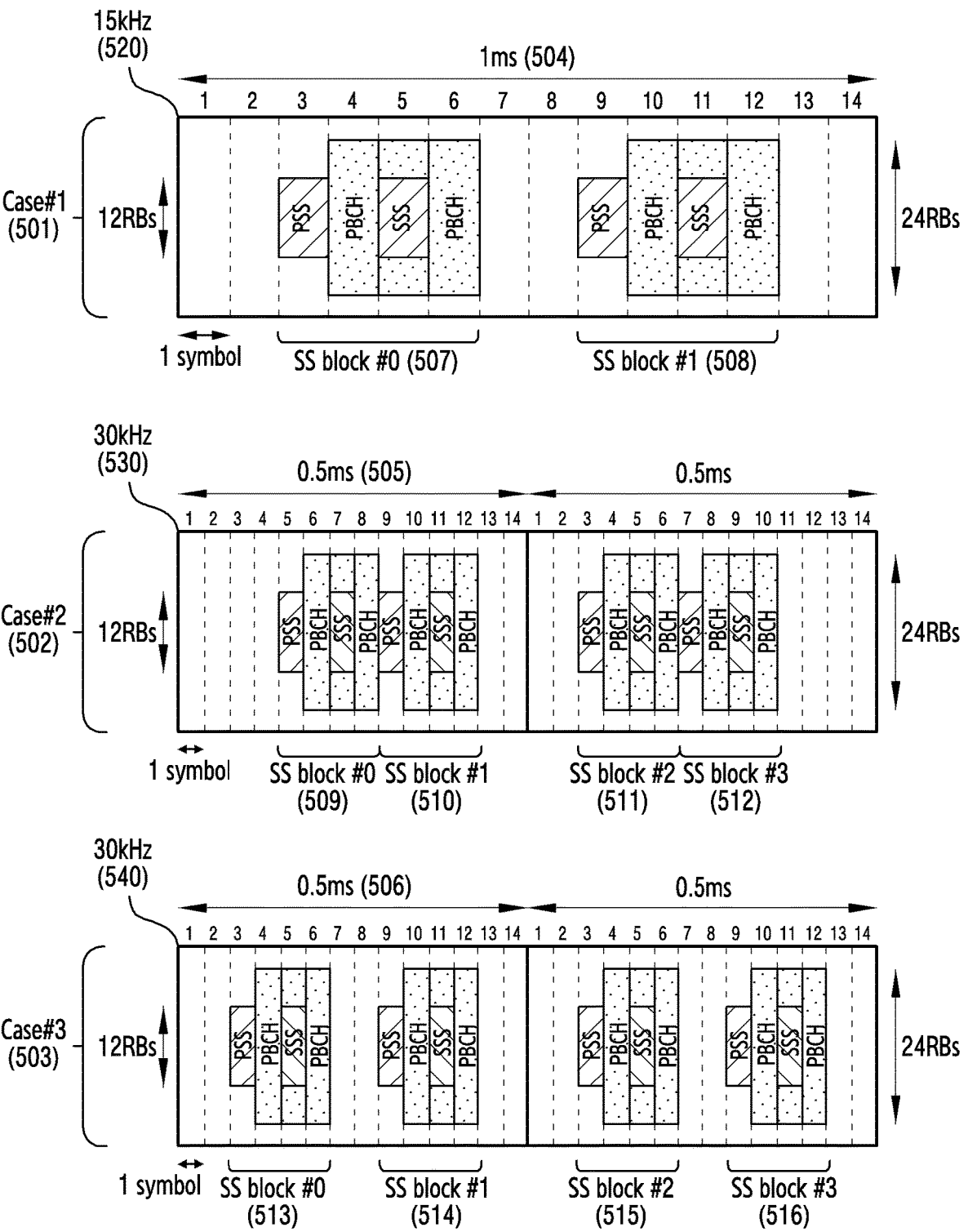
FIGS. 5 and 6 illustrates various cases of transmitting SSBs, according to an embodiment.
Figure 6:
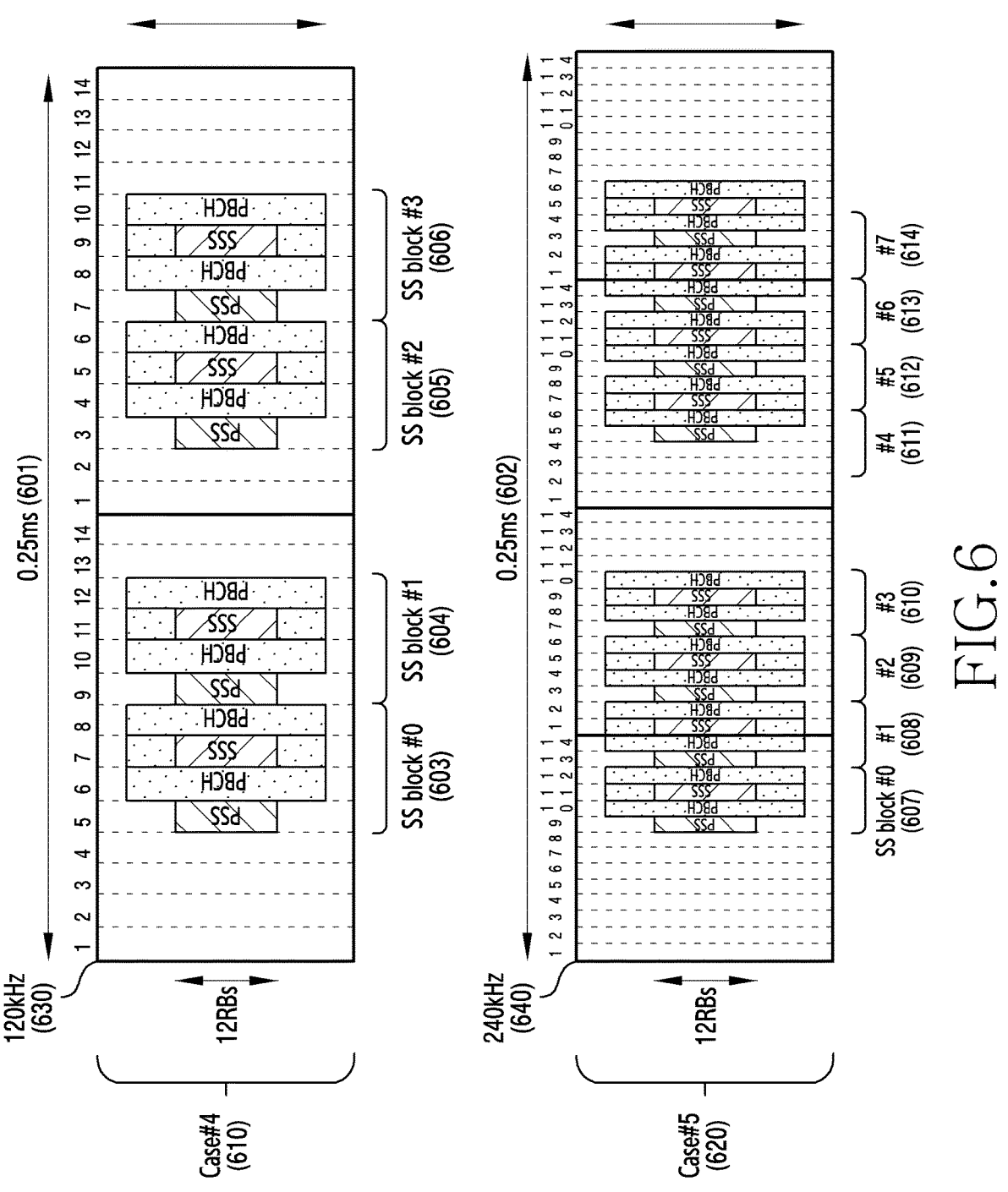

FIGS. 5 and 6 illustrate various cases of transmitting SSBs, according to an embodiment.

Referring to FIG. 5, in a 5G communication system, an SCS 520 of 15 kHz and an SCS 530 or 540 of 30 kHz may be used for SSB transmission in a frequency band less than or equal to 6 GHz. There may be one transmission case (e.g., case #1 501) for an SSB in the SCS 520 of 15 kHz, and there may be two transmission cases (e.g., case #2 502 and case #3 503) for an SSB in the SCS 530 or 540 of 30 kHz.

In case #1 501 with the SCS of 15 kHz 520, up to 2 SSBs may be transmitted in 1 ms of time 504 (or corresponding to a length of one slot when one slot includes 14 OFDM symbols). For example, SSB #0 507 may be mapped to four consecutive symbols starting from a 3rd OFDM symbol, and SSB #1 508 may be mapped to four consecutive symbols starting from a 9th OFDM symbol.

According to an embodiment, different analog beams may be applied to SSB #0 507 and SSB #1 508.

According to another embodiment, the same beam may be applied to all of the 3rd to 6th OFDM symbols to which SSB #0 507 is mapped, and the same beam may be applied to all of the 9th to 12th OFDM symbols to which SSB #1 508 is mapped. With regard to beams to be used for a 7th, an 8th, a 13th, and a 14th OFDM symbol to which no SSB is mapped, an analog beam may be freely determined at the discretion of a BS.

In case #2 502 with the SCS of 30 kHz 530, up to 2 SSBs may be transmitted in 0.5 ms of time 505 (or corresponding to a length of one slot when one slot includes 14 OFDM symbols), and accordingly, up to 4 SSBs may be transmitted in 1 ms of time (or corresponding to a length of two slots when one slot includes 14 OFDM symbols). For example, in FIG. 5, a case where SSB #0 509, SSB #1 510, SSB #2 511, and SSB #3 512 are transmitted in 1 ms of time (i.e., two slots) is illustrated. SSB #0 509 and SSB #1 510 may be mapped starting from a 5th OFDM symbol and a 9th OFDM symbol of a first slot, respectively, and SSB #2 511 and SSB #3 512 may be mapped starting from a 3rd OFDM symbol and a 7th OFDM symbol of a second slot, respectively.

According to an embodiment, different analog beams may be applied to SSB #0 509, SSB #1 510, SSB #2 511, and SSB #3 512, respectively.

According to another embodiment, the same analog beam may be applied to all of the 5th to 8th OFDM symbols of the first slot in which SSB #0 509 is transmitted, the 9th to 12th OFDM symbols of the first slot in which SSB #1 510 is transmitted, the 3rd to 6th symbols of the second slot in which SSB #2 511 is transmitted, and the 7th to 10th symbols of the second slot in which SSB #3 512 is transmitted. With regard to beams to be used for OFDM symbols to which no SSB is mapped, analog beams may be freely determined at the discretion of a BS.

In case #3 503 with the SCS of 30 kHz 540, up to 2 SSBs may be transmitted in 0.5 ms of time 506 (or corresponding to a length of one slot when one slot includes 14 OFDM symbols), and accordingly, up to 4 SSBs may be transmitted in 1 ms of time (or corresponding to a length of two slots when one slot includes 14 OFDM symbols). For example, in FIG. 5, transmission of SSB #0 513, SSB #1 514, SSB #2 515, and SSB #3 516 in 1 ms of time (i.e., two slots) is illustrated. SSB #0 513 and SSB #1 514 may be mapped starting from a 3rd OFDM symbol and a 9th OFDM symbol of a first slot, respectively, and SSB #2 515 and SSB #3 516 may be mapped starting from a 3rd OFDM symbol and a 9th OFDM symbol of a second slot, respectively.

According to an embodiment, different analog beams may be used in SSB #0 513, SSB #1 514, SSB #2 515, and SSB #3 516, respectively.

As described above, the same analog beam may be used for all of the four OFDM symbols in which respective SSBs are transmitted. For OFDM symbols to which no SSB is mapped, beams to be used may be freely determined at the discretion of a BS.

Referring to FIG. 6, in a 5G communication system, in a frequency band greater than or equal to 6 GHz, a SCS of 120 kHz 630 related to case #4 610 and a SCS of 240 kHz 640 related to case #5 620 may be used for SSB transmission.

Referring to case #4 610 with the SCS of 120 kHz 630, up to 4 SSBs may be transmitted in 0.25 ms of time 601 (or corresponding to a length of two slots when one slot includes 14 OFDM symbols). For example, in FIG. 6, a case where SSB #0 603, SSB #1 604, SSB #2 605, and SSB #3 606 are transmitted in 0.25 ms of time (i.e., two slots) is illustrated. SSB #0 603 and SSB #1 604 may be respectively mapped to four consecutive symbols starting from a 5th OFDM symbol and four consecutive symbols starting from a 9th OFDM symbol of a first slot, and SSB #2 605 and SSB #3 606 may be respectively mapped to four consecutive symbols starting from a 3rd OFDM symbol and four consecutive symbols starting from a 7th OFDM symbol of a second slot.

As described above, different analog beams may be used in SSB #0 603, SSB #1 604, SSB #2 605, and SSB #3 606, respectively. Additionally, the same analog beam may be used for all of the four OFDM symbols in which respective SSBs are transmitted. For OFDM symbols to which no SSB is mapped, beams to be used may be freely determined at the discretion of a BS.

Referring to case #5 620 with the SCS of 240 kHz 640, up to 8 SSBs may be transmitted in 0.25 ms of time 602 (or corresponding to a length of four slots when one slot includes 14 OFDM symbols). For example, in FIG. 6, a case where SSB #0 607, SSB #1 608, SSB #2 609, SSB #3 610, SSB #4 611, SSB #5 612, SSB #6 613, and SSB #7 614 are transmitted in 0.25 ms of time (i.e., four slots) is illustrated.

SSB #0 607 and SSB #1 608 may be respectively mapped to four consecutive symbols starting from a 9th OFDM symbol and four consecutive symbols starting from a 13th OFDM symbol of a first slot, SSB #2 609 and SSB #3 610 may be respectively mapped to four consecutive symbols starting from a 3rd OFDM symbol and four consecutive symbols starting from a 7th OFDM symbol of a second slot, SSB #4 611, SSB #5 612, and SSB #6 613 may be respectively mapped to four consecutive symbols starting from a 5th OFDM symbol, four consecutive symbols starting from a 9th OFDM symbol, and four consecutive symbols starting from a 13th OFDM symbol of a third slot, or SSB #7 614 may be mapped to four consecutive symbols starting from a 3rd OFDM symbol of a fourth slot.

As described above, different analog beams may be applied to SSB #0 607, SSB #1 608, SSB #2 609, SSB #3 610, SSB #4 611, SSB #5 612, SSB #6 613, and SSB #7 614, respectively. Additionally, the same analog beam may be used for all of the four OFDM symbols in which respective SSBs are transmitted. For OFDM symbols to which no SSB is mapped, beams to be used may be freely determined at the discretion of a BS.

Figure 7:
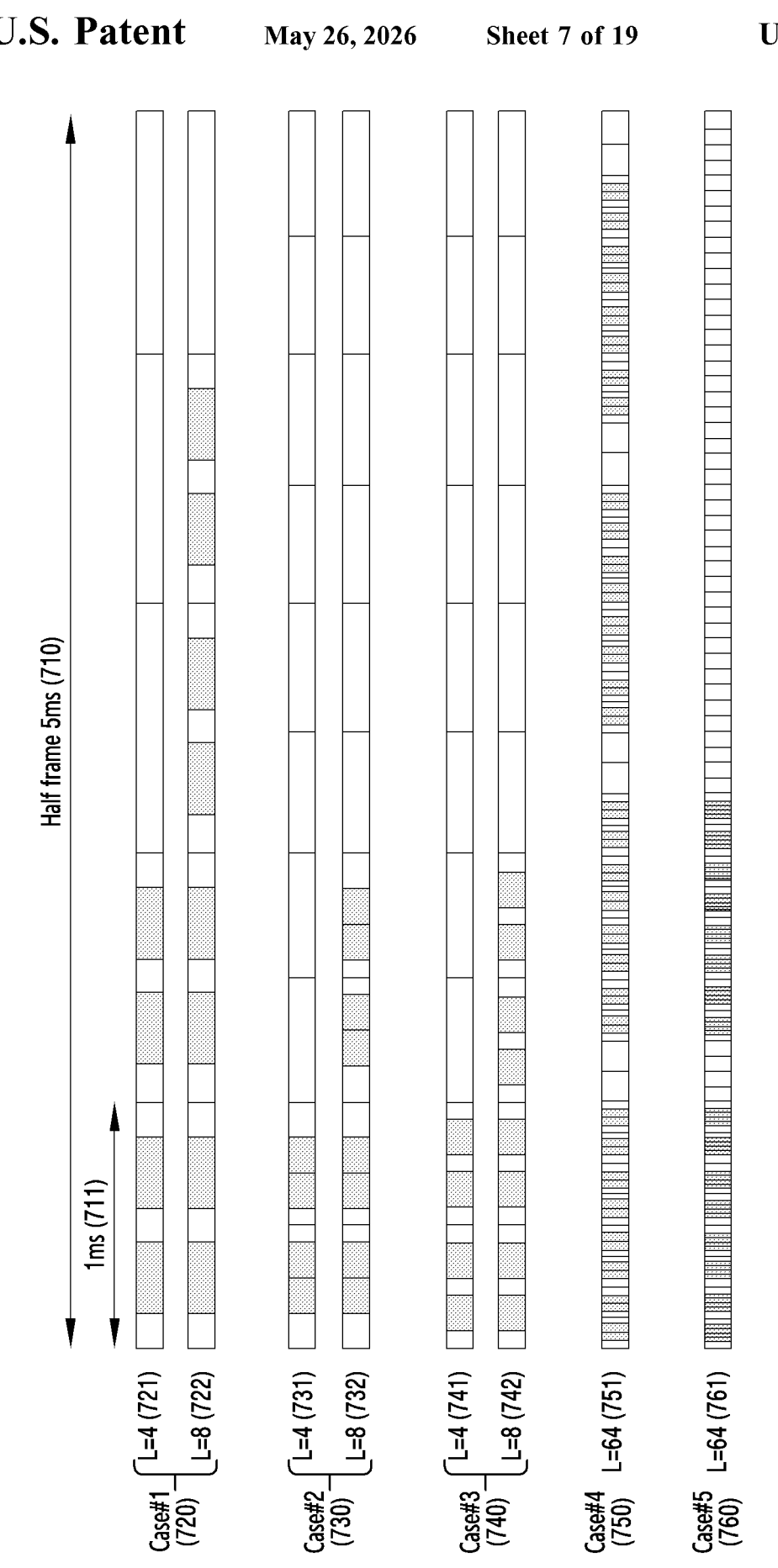
FIG. 7 illustrates cases of transmitting SSBs according to subcarrier spacing (SCS) within 5 ms of time in a wireless communication system, according to an embodiment.

FIG. 7 illustrates cases of transmitting SSBs according to SCS within 5 ms of time in a wireless communication system, according to an embodiment.

Referring to FIG. 7, in a 5G communication system, SSBs may be transmitted periodically, e.g., in units of time intervals 710 of 5 ms (corresponding to 5 subframes or a half frame).

In a frequency band less than or equal to 3 GHz, up to 4 SSBs may be transmitted within 5 ms of time 710. In a frequency band greater than 3 GHz and lower than or equal to 6 GHz, up to 8 SSBs may be transmitted. In a frequency band greater than 6 GHz, up to 64 SSBs may be transmitted. As described above, SCSs of 15 kHz and 30 kHz may be used at a frequency less than or equal to 6 GHz.

Referring to case #1 501 including one slot with the SCS of 15 kHz in FIG. 5, SSBs may be mapped to the first slot and the second slot so as to enable transmission of up to 4 SSBs 721 in the frequency band less than or equal to GHz, and may be mapped to the first, second, third, and fourth slots so as to enable transmission of up to 8 SSBs 722 in the frequency band greater than 3 GHz and less than or equal to 6 GHz.

With regard to case #2 502 or case #3 503 including two slots with the SCS of 30 kHz in FIG. 5, SSBs may be mapped starting from the first slot so as to enable transmis- With regard to case #5 620 including four slots with the SCS of 240 kHz, SSBs may be mapped starting from the 1st, 5th, 9th, 13th, 21st, 25th, 29th, and 33rd slots so as to enable transmission of up to 64 SSBs 761 in the frequency band greater than 6 GHz.

A terminal may decode a PDCCH and a PDSCH, based on system information included in a received MIB, and then acquire an SIB. The SIB may include at least one of UL cell BW-related information, a random-access parameter, a paging parameter, or a UL power control-related parameter.

In general, the terminal may establish a radio link to a network via random-access, based on system information and synchronization with the network acquired during a cell search procedure. A contention-based or contention-free scheme may be used for random access. When the terminal performs cell selection and re-selection during initial access of a cell (e.g., for the purpose of moving from an RRC_IDLE (RRC idle) state to an RRC_CONNECTED (RRC connected) state), the contention-based random-access scheme may be used. The contention-free random access may be used to re-establish UL synchronization in case of DL data arrival, handover, or location measurement.

Table 3 below illustrates conditions (events) for triggering of random access in the 5G system.

TABLE 3

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g. handover);
RRC Connection Resume procedure from RRC_INACTIVE;
To establish time alignment for a secondary TAG;
Request for Other SI:
Beam failure recovery;
Consistent UL LBT failure on SpCell.

sion of up to 4 SSBs 731 and 741 in the frequency band less than or equal to 3 GHz, and may be mapped starting from the first and third slots so as to enable transmission of up to 8 SSBs 732 and 742 in the frequency band greater than 3 GHz and less than or equal to 6 GHz.

The SCSs of 120 kHz and 240 kHz may be used at a frequency greater than 6 GHz. With regard to case #4 610 including two slots with the SCS of 120 kHz, SSBs may be mapped starting from the 1st, 3rd, 5th, 7th, 11th, 13th, 15th, 17th, 21st, 23rd, 25th, 27th, 31st, 33rd, 35th, and 37th slots so as to enable transmission of up to 64 SSBs in the frequency band greater than 6 GHz.

The aforementioned parameters are merely examples and are not limited thereto, and of course, equal or substantially similar parameters may be further included.

Hereinafter, description will be provided for a measurement time configuration method for radio resource management (RRM) based on an SSB (SS block or SSB) of a 5G wireless communication system.

A terminal may be configured with MeasObjectNR of MeasObjectToAddModList for SSB-based intra/inter-frequency measurements and CSI-RS-based intra/inter-frequency measurements via higher-layer signaling. For example, MeasObjectNR may be configured as shown in Table 4 below.

TABLE 4

| MeasObjectNR ::= | SEQUENCE { | | |
|---|---|---|---|
| ssbFrequency   ARFCN-ValueNR | | | OPTIONAL,   -- Cond SSBorAssociatedSSB |
| ssbSubcarrierSpacing | SubcarrierSpacing | | OPTIONAL,   -- Cond |
| SSBorAssociatedSSB | | | |
| smtc1 | SSB-MTC | | OPTIONAL,   -- |
| Cond SSBorAssociatedSSB | | | |
| smtc2 | SSB-MTC2 | | OPTIONAL,   -- |
| Cond IntraFreqConnected | | | |
| refFreqCSI-RS | ARFCN-ValueNR | | OPTIONAL,   -- Cond |
| CSI-RS | | | |
| referenceSignalConfig | ReferenceSignalConfig, | | |
| absThreshSS-BlocksConsolidation | ThresholdNR | | OPTIONAL,   -- Need R |

TABLE 4-continued

| | | |
|---|---|---|
| absThreshCSI-RS-Consolidation | ThresholdNR | OPTIONAL, -- Need R |
| nrofSS-BlocksToAverage | INTEGER (2..maxNrofSS-BlocksToAverage) | OPTIONAL, -- Need R |
| nrofCSI-RS-ResourcesToAverage | INTEGER (2..maxNrofCSI-RS-ResourcesToAverage) | OPTIONAL, -- Need R |
| quantityConfigIndex | INTEGER (1..maxNrofQuantityConfig), | |
| offsetMO | Q-OffsetRangeList, | |
| cellsToRemoveList | PCI-List | OPTIONAL, -- Need N |
| cellsToAddModList | CellsToAddModList | OPTIONAL, -- Need N |
| blackCellsToRemoveList | PCI-RangeIndexList | OPTIONAL, -- Need N |
| blackCellsToAddModList | SEQUENCE (SIZE (1..maxNrofPCI-Ranges)) | OPTIONAL, -- Need N |
| | OF PCI-RangeElement | |
| whiteCellsToRemoveList | PCI-RangeIndexList | OPTIONAL, -- Need N |
| whiteCellsToAddModList | SEQUENCE (SIZE (1..maxNrofPCI-Ranges)) | OPTIONAL, -- Need N |
| | OF PCI-RangeElement | |
| ..., | | |
| [[ | | |
| freqBandIndicatorNR | FreqBandIndicatorNR | OPTIONAL, -- Need R |
| measCycleSCell | ENUMERATED (sf160, sf256, sf320, | OPTIONAL -- Need R |
| | sf512, sf640, sf1024, sf1280) | |
| ]], | | |
| [[ | | |
| smtc3list-r16 | SSB-MTC3List-r16 | OPTIONAL, -- Need R |
| rmtc-Config-f16 | SetupRelease {RMTC-Config-r16} | OPTIONAL, -- Need M |
| t312-r16 | SetupRelease { T312-r16 } | OPTIONAL -- Need M |
| ]] | | |
| } | | | ssbFrequency: A frequency of an SS related to MeasObjectNR may be configured.

ssbSubcarrierSpacing: A SCS of SSB may be configured. Frequency range 1 (FR1) may apply only 15 kHz or 30 kHz, and frequency range 2 (FR2) may apply only 120 kHz or 240 kHz.

smtc1: An SS/PBCH block measurement timing configuration (SMTC) may be indicated, a primary measurement timing configuration may be configured, and a timing offset and duration for an SSB may be configured.

smtc2: A secondary measurement timing configuration for an SSB related to MeasObjectNR having a PCI listed in pci-List may be configured.

The aforementioned parameters are merely examples and are not limited thereto, and of course, equal or substantially similar parameters may be further included.

In addition, the aforementioned parameters may be configured via other higher-layer signaling. For example, at least one of SMTCs via reconfigurationWithSync for NR primary secondary cell (PSCell) change and NR primary cell (PCell) change or SIB2 for intra-frequency, inter-frequency, and inter-RAT cell re-selection may be configured for the terminal. In addition, in order to add an NR secondary cell (SCell), an SMTC via SCellConfig may be configured for the terminal.

For SSB measurement, the terminal may configure a first SMTC according to periodictiyAndOffset (providing periodicity and offset), based on smtc1 configured via higher-layer signaling. In an embodiment, a first subframe of each SMTC occasion may start from an SFN and a subframe of a special cell (SpCell) which satisfy conditions in Table 5 below.

TABLE 5

| |
|---|
| SFN mod T = (FLOOR (Offset/10)); |
| if the Periodicity is larger than sf5: |
| subframe = Offset mod 10; |

TABLE 5-continued

| |
|---|
| else: |
| subframe = Offset or (Offset +5); |
| with T = CEIL(Periodicity/10). |

The aforementioned parameters are merely examples and are not limited thereto, and of course, equal or substantially similar parameters may be further included.

According to an embodiment, when smtc2 is configured, for cells indicated by pci-List values of smtc2 in the same MeasObjectNR, the terminal may configure an additional SMTC according to the periodicity of configured smtc2 and the offset and duration of smtc1. For the same frequency (e.g., a frequency for intra frequency cell re-selection) or different frequencies (e.g., frequencies for inter frequency cell re-selection), the terminal may be configured with smtc and measure an SSB, based on smtc3list related to smtc2-LP (with long periodicity) and integrated access and backhaul-mobile termination (IAB-MT). The terminal may not consider an SSB transmitted in a subframe other than an SMTC occasion for SSB-based RRM measurement in configured ssbFrequency.

A BS may use various multi-transmit/receive point (TRP) operation schemes depending on a serving cell configuration and a PCI configuration.

When two TRPs at physically distant locations have different PCIs, there may be two methods for operating the two TRPs from among the multi-TRP operation schemes. [Operation Method 1]

Two TRPs having different PCIs may be operated with two serving cell configurations.

The BS may add, to different serving cell configurations, channels and signals transmitted in different TRPs so as to configure the same via [operation method 1]. For example, each TRP may having an independent serving cell configuration, and frequency band values of FrequencyInfoDL indicated by DownlinkConfigCommon in each serving cell configuration may indicate at least some overlapping bands. Since multiple TRPs operate based on multiple ServCellIndex (e.g., ServCellIndex #1 and ServCellIndex #2) values, respective TRPs may use separate PCIs. For example, the BS may assign one PCI per ServCellIndex.

In the case described above, when multiple SSBs are transmitted in TRP 1 and TRP 2, the SSBs may have different PCIs (e.g., PCI #1 and PCI #2), and the BS may appropriately select a value of ServCellIndex indicated by a cell parameter in quasi-co location (QCL) information so as to map a PCI appropriate for each TRP, and may designate an SSB transmitted in one of TRP 1 and TRP 2, as a source reference RS of QCL configuration information. However, since the aforementioned configuration is to apply, to multiple TRPs, one serving cell configuration which may be used for carrier aggregation (CA) of the terminal, there may be a problem of increasing signaling burden or restricting a degree of freedom in CA configuration.

[Operation Method 2]

Two TRPs having different PCIs may be operated with one serving cell configuration.

The BS may configure, via one serving cell configuration, channels and signals transmitted in different TRPs, via [operation method 2]. Because the terminal operates based on one ServCellIndex (e.g., ServCellIndex #1), a PCI (e.g., PCI #2) assigned to a second TRP may not be able to be recognized. [Operation method 2] may have a higher degree of freedom in CA configuration when compared to [operation method 1] described above, but when multiple SSBs are transmitted in TRP 1 and TRP 2, the SSBs may have different PCIs (e.g., PCI #1 and PCI #2), and it may be impossible for the BS to map the PCI (e.g., PCI #2) of the second TRP via ServCellIndex indicated by a cell parameter in QCL-Info. The BS may be able to designate, as a source RS of QCL configuration information, only an SSB transmitted in TRP 1 and may not be able to designate an SSB transmitted in TRP 2.

As described above, [operation method 1] is capable of performing multi-TRP operation for two TRPs having different PCIs via an additional serving cell configuration without additional standard support, but [operation method 2] may be operated based on additional UE capability reporting and BS configuration information described below.

Relating to UE Capability Reporting for [Operation Method 2]

A terminal may report, to the BS via UE capability, that configuration of an additional PCI other than a PCI of a serving cell is possible from the BS via higher-layer signaling. The UE capability may include two independent numbers of X1 and X2, or each of X1 and X2 may be reported via independent UE capability.

X1 may refer to the maximum number of additional PCIs which may be configured for the terminal A PCI may be different from the PCI of the serving cell, in which case, the time domain position and periodicity of an SSB corresponding to the additional PCI may be the same as those of an SSB of the serving cell.

X2 may refer to the maximum number of additional PCIs which may be configured for the terminal. In this case, a PCI may be different from the PCI of the serving cell, wherein the time domain position and periodicity of an SSB corresponding to the additional PCI may be different from those of the SSB corresponding to the PCI reported with X1.

Due to the above definition, PCIs corresponding to values reported with X1 and X2 may not be configured simultaneously.

Each of the values (values reported with X1 and X2) reported via UE capability reporting may have an integer value from 0 to 7.

For the values reported with X1 and X2, different values may be reported in FR1 and FR2.

Relating to Higher-Layer Signaling for [Operation Method 2]

A terminal may be configured with higher-layer signaling of SSB-MTCAdditionalPCI-r17 from the BS, based on the UE capability reporting described above. The higher-layer signaling may at least include multiple additional PCIs having values different from a value of the serving cell, SSB transmission power corresponding to each additional PCI, and ssb-PositionInBurst corresponding to each additional PCI, and the maximum number of additional PCIs which can be configured may be 7.

As an assumption on an SSB corresponding to an additional PCI having a value different from that of the serving cell, the terminal may assume that a center frequency, a SCS, or a subframe number offset for the SSB is the same as that for the SSB of the serving cell.

The terminal may assume that a reference RS (e.g., SSB or CSI-RS) corresponding to the PCI of the serving cell is always connected to an activated transmission configuration indicator (TCI) state. For the additionally configured PCIs having values different from the value of the serving cell, if there are one or multiple PCIs, the terminal may assume that only one PCI among the PCIs is connected to the activated TCI state.

If the terminal is configured with two different coresetPoolIndex values, the reference RS corresponding to the serving cell PCI is connected to one or multiple activated TCI states, and a reference RS corresponding to the additionally configured PCI having a value different from that of the serving cell is connected to one or more activated TCI states, the terminal may expect that the activated TCI state(s) connected to the PCI of the serving cell is connected to one coresetPoolIndex out of two, or that the activated TCI state(s) connected to the additionally configured PCI having a value different from that of the serving cell is connected to the remaining one coresetPoolIndex.

Based on the higher-layer signaling of the BS and UE capability reporting for [operation method 2] described above, the additional PCI having a value different from that of the PCI of the serving cell may be configured. If there is no configuration, the SSB, which cannot be designated as a source RS and corresponds to the additional PCI having a value different from that of the PCI of the serving cell, may be used for designation as a source RS of QCL configuration information. This may also be used to serve as a QCL source RS to support operation of multiple TRPs having different PCIs, unlike the SSB which may be configured to be used for purposes, such as RRM, mobility, or handover, like configuration information on the SSB, which may be configured in smtc1 and smtc2 of higher-layer signaling.

A DMRS may include multiple DMRS ports, and each of the ports may maintain orthogonality by using code division multiplexing (CDM) or frequency division multiplexing (FDM) so as to prevent interference with each other. However, the term DMRS may be expressed in other terms that are substantially similar or equivalent, depending on the intention of a user and the purpose of using the RS. The term DMRS merely provides a specific example to easily explain the technical content of the disclosure and to help understanding of the disclosure, and is not intended to limit the scope of the disclosure. In other words, it is apparent to those skilled in the art belonging to the disclosure, that the disclosure can be implemented for any RS based on the technical idea of the disclosure.

Figure 8:
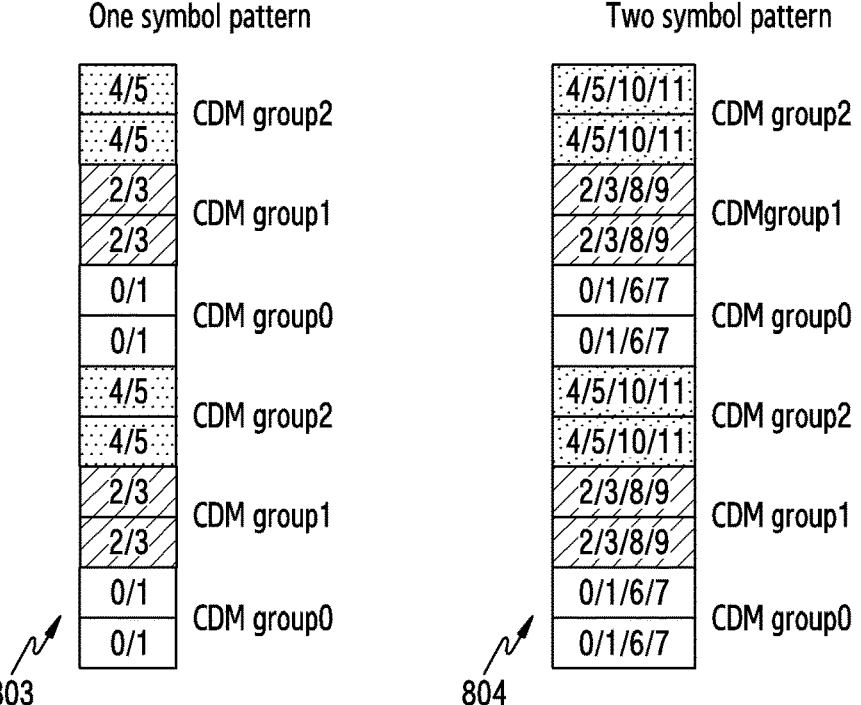
FIG. 8 illustrates demodulation reference signal (DMRS) patterns (type1 and type2) used for communication between a BS and a terminal, according to an embodiment.

FIG. 8 illustrates DMRS patterns (type 1 and type2) used for communication between a BS and a terminal, according to an embodiment.

Referring to FIG. 8, patterns 801 and 802 correspond to DMRS type1, where the pattern 801 represents a 1-symbol pattern and the pattern 802 represents a 2-symbol pattern. DMRS type 1 of the pattern 801 and pattern 802 is a DMRS pattern with a comb 2 structure and may include two CDM groups, and different CDM groups may be FDMed.

In the 1-symbol pattern 801, CDM on frequency is applied to the same CDM group so that two DMRS ports may be distinguished, and therefore a total of four orthogonal DMRS ports may be configured. The 1-symbol pattern 801 may include a DMRS port ID mapped to each CDM group (e.g., a DMRS port ID for DL may be indicated by an illustrated number+1000).

In the 2-symbol pattern 802, CDM on time/frequency is applied to the same CDM group so that four DMRS ports may be distinguished, and therefore a total of eight orthogonal DMRS ports may be configured. The 2-symbol pattern 802 may include a DMRS port ID mapped to each CDM group (e.g., a DMRS port ID for DL may be indicated by an illustrated number+1000).

DMRS type2 illustrated in patterns 803 and 804 is a DMRS pattern with a structure in which frequency domain orthogonal cover codes (FD-OCCs) are applied to a subcarrier adjacent on frequency, and may include three CDM groups, and different CDM groups may be FDMed.

to each CDM group (e.g., a DMRS port ID for DL may be indicated by an illustrated number+1000).

As described above, in an NR system, two different DMRS patterns (e.g., the DMRS patterns 801 and 802 or the DMRS patterns 803 and 804) may be configured, and whether each DMRS pattern is a one-symbol pattern 801 or 803 or is an adjacent two-symbol pattern 802 or 804 may also be configured. In addition, in the NR system, not only may a DMRS port number be scheduled, but the number of CDM groups scheduled together for PDSCH rate matching may be configured and signaled. In addition, for cyclic prefix-based OFDM (CP-OFDM), both the aforementioned two DMRS patterns may be supported in DL and UL, and for DFT-S-OFDM, only DMRS type 1 among the aforementioned DMRS patterns may be supported in UL.

According to an embodiment, an additional DMRS may be supported to be configurable. A front-loaded DMRS may refer to a first DMRS transmitted or received in a front-most symbol in the time domain from among DMRSs, and an additional DMRS may refer to a DMRS transmitted or received in a symbol that follows the front-loaded DMRS in the time domain. In the NR system, the number of additional DMRSs may be configured to be a minimum of 0 to a maximum of 3. In addition, when an additional DMRS is configured, the same pattern as the front-loaded DMRS may be assumed. When information on whether the DMRS pattern type described for the front-loaded DMRS is type1 or type2, information on whether the DMRS pattern is a one-symbol pattern or is an adjacent two-symbol pattern, and information on a DMRS port and the number of CDM groups used are indicated, in case that an additional DMRS is configured additionally, the additional DMRS may be assumed to be configured with the same DMRS information as that for the front-loaded DMRS.

The DL DMRS configuration described above may be configured via RRC signaling as shown in Table 6 below.

TABLE 6

| DMRS-DownlinkConfig ::= | SEQUENCE { | |
|---|---|---|
| dmrs-Type | ENUMERATED {type2} | OPTIONAL, -- Need S |
| dmrs-AdditionalPosition | ENUMERATED {pos0, pos1, pos3} | OPTIONAL, -- Need S |
| maxLength | ENUMERATED {len2} | OPTIONAL, -- Need S |
| scramblingID0 | INTEGER (0..65535) | OPTIONAL, -- Need S |
| scramblingID1 | INTEGER (0..65535) | OPTIONAL, -- Need S |
| phaseTrackingRS | SetupRelease {PTRS-DownlinkConfig} | OPTIONAL, -- Need M |
| ... | | |
| } | | |

In the 1-symbol pattern 803, CDM on frequency is applied to the same CDM group so that two DMRS ports may be distinguished, and therefore a total of six orthogonal DMRS ports may be configured. The 1-symbol pattern 803 may include a DMRS port ID mapped to each CDM group (e.g., a DMRS port ID for DL may be indicated by an illustrated number+1000). In the 2-symbol pattern 804, CDM on time/frequency is applied to the same CDM group so that four DMRS ports may be distinguished, and therefore a total of 12 orthogonal DMRS ports may be configured. The 2-symbol pattern 804 may include a DMRS port ID mapped In Table 6, dmrs-Type may configure a DMRS type, dmrs-AdditionalPosition may configure additional DMRS OFDM symbols, maxLength may configure a 1-symbol DMRS pattern or a 2-symbol DMRS pattern, scramblingID0 and scramblingID1 may configure scrambling IDs, and phaseTrackingRS may configure a phase tracking RS (PTRS).

The aforementioned parameters are merely examples and are not limited thereto, and of course, equal or substantially similar parameters may be further included.

In addition, a UL DMRS configuration as described above may be configured via RRC signaling as shown in Table 7 below.

TABLE 7

| DMRS-UplinkConfig ::= | SEQUENCE { | |
|---|---|---|
| dmrs-Type | ENUMERATED {type2} | OPTIONAL,  -- Need S |
| dmrs-AdditionalPosition | ENUMERATED {pos0, pos1, pos3} | OPTIONAL,  -- Need R |
| phaseTrackingRS | SetupRelease { PTRS-UplinkConfig } | OPTIONAL,  -- Need M |
| maxLength | ENUMERATED {len2} | OPTIONAL,  -- Need S |
| transformPrecodingDisabled | SEQUENCE { | |
| scramblingID0 | INTEGER (0..65535) | OPTIONAL,  -- Need S |
| scramblingID1 | INTEGER (0..65535) | OPTIONAL,  -- Need S |
| ... | | |
| } | | OPTIONAL,  -- Need R |
| transformPrecodingEnabled | SEQUENCE { | |
| nPUSCH-Identity | INTEGER (0..1007) | OPTIONAL,  -- Need S |
| sequenceGroupHopping | ENUMERATED {disabled} | OPTIONAL,  -- Need S |
| sequenceHopping | ENUMERATED {enabled} | OPTIONAL,  -- Need S |
| ... | | |
| } | | OPTIONAL,  -- Need R |
| ... | | |
| } | | |

In Table 7, dmrs-Type may configure a DMRS type, dmrs-AdditionalPosition may configure additional DMRS OFDM symbols, phaseTrackingRS may configure a PTRS, and maxLength may configure a 1-symbol DMRS pattern or a 2-symbol DMRS pattern. The scramblingID0 and the scramblingID1 may configure scrambling ID0s, nPUSCH-Identity may configure a cell ID for DFT-s-OFDM, sequenceGroupHopping may disable sequence group hopping, and sequenceHopping may enable sequence hopping.

The aforementioned parameters are merely examples and are not limited thereto, and of course, equal or substantially similar parameters may be further included.

Figure 9:
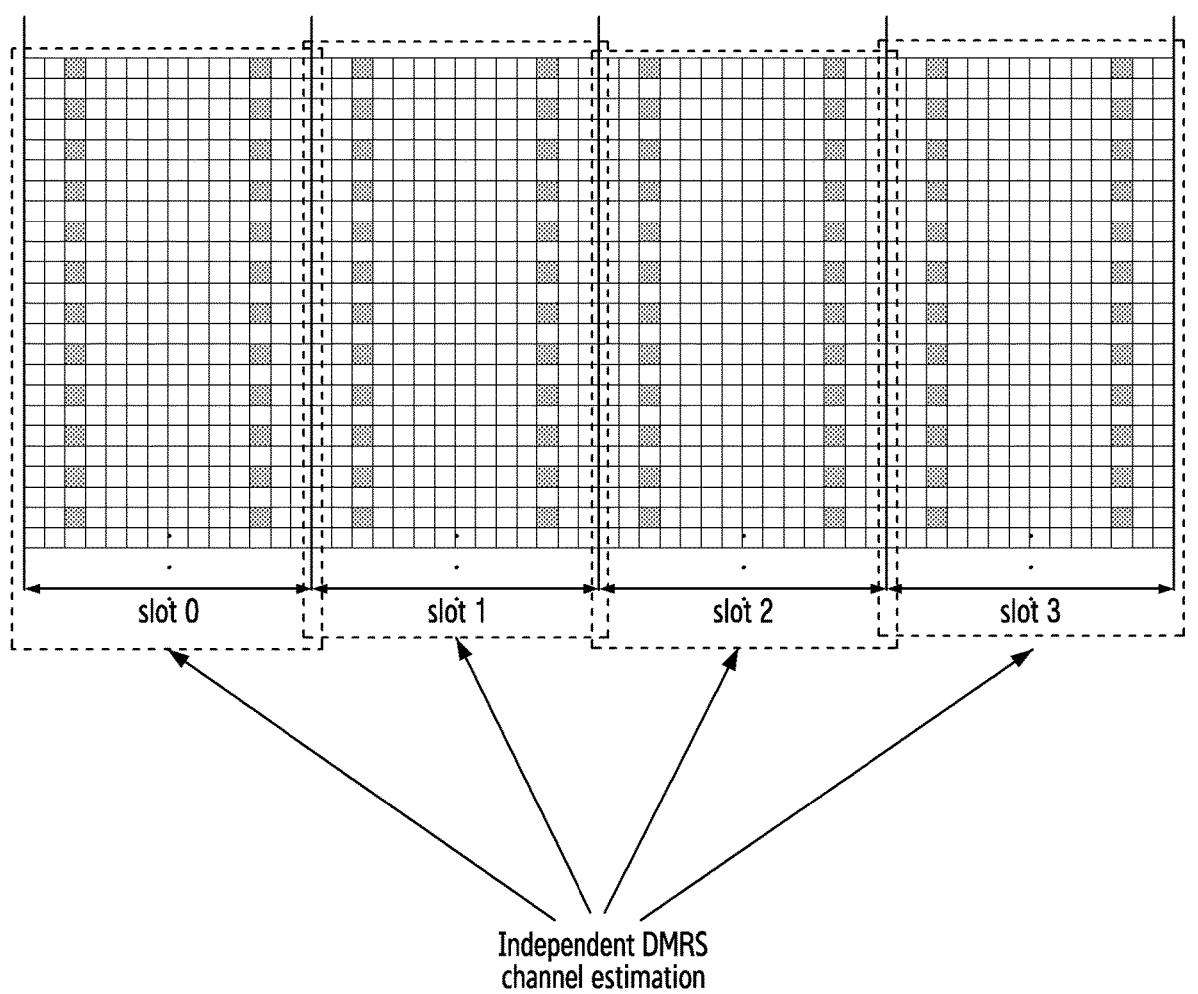
FIG. 9 illustrates channel estimation using a DMRS received from a physical UL shared channel (PUSCH), according to an embodiment.

FIG. 9 illustrates channel estimation using a DMRS received from a PUSCH, according to an embodiment.

Referring to FIG. 9, when performing channel estimation for data decoding using a DMRS, the channel estimation may be performed within a precoding RB group (PRG) in a Allocations=17) for the PUSCH. TDRA information may include, e.g., at least one of PDCCH-to-PDSCH slot timing (denoted as K0, and corresponding to a time interval in units of slots between a time point at which the PDCCH is received and a time point at which the PDSCH scheduled by the received PDCCH is transmitted) or PDCCH-to-PUSCH slot timing (denoted as K2, and corresponding to a time interval in units of slots between a time point at which the PDCCH is received and a time point at which the PUS CH scheduled by the received PDCCH is transmitted), information on a position and a length of a start symbol scheduled for the PDSCH or PUSCH within a slot, and a mapping type of the PDSCH or PUSCH.

The TDRA information for the PDSCH may be configured for the terminal via RRC signaling as shown in Table 8 below.

TABLE 8

| PDSCH-TimeDomainResourceAllocationList information element | | |
|---|---|---|
| PDSCH-TimeDomainResourceAllocationList ::= TimeDomainResourceAllocation | SEQUENCE (SIZE(1..maxNrofDL-Allocations)) OF PDSCH- | |
| PDSCH-TimeDomainResourceAllocation ::= | SEQUENCE { | |
| k0 | INTEGER(0..32) | OPTIONAL,  -- Need S |
| mappingType | ENUMERATED {typeA, typeB}, | |
| startSymbolAndLength | INTEGER (0..127) | |
| repetitionNumber | ENUMERATED {n2, a3, n4, n5, n6, n7, n8, n16} | OPTIONAL,  -- Cond |
| Formats1-0and1-1 | | |
| } | | | bundling unit by using physical RB (PRB) bundling linked to a system band in a frequency band. In addition, the channel estimation may be performed by assuming that only a DMRS received on one PUSCH in a time unit has the same precoding.

Hereinafter, a time domain resource allocation (TDRA) method for data a channel in the 5G communication system will be described. ABS may configure, for a terminal via higher-layer signaling (e.g., RRC signaling), a TDRA information table for a DL data channel (e.g., a PDSCH) and a UL data channel (e.g., a PUSCH).

The BS may configure a table including up to 17 entries (maxNrofDL-Allocations=17) for the PDSCH, and may configure a table including up to 17 entries (maxNrofUL- In Table 8, k0 denotes PDCCH-to-PDSCH timing (e.g., a slot offset between DCI and the scheduled PDSCH) in units of slots, mappingType may denote a PDSCH mapping type, startSymbolAndLength may denote a start symbol and a length of the PDSCH, and repetitionNumber may denote the number of PDSCH transmission occasions according to a slot-based repetition scheme.

The aforementioned parameters are merely examples and are not limited thereto, and of course, equal or substantially similar parameters may be further included.

The TDRA information for the PUSCH may be configured for the terminal via RRC signaling as shown in Table 9 below.

TABLE 9

| PUSCH-TimeDomainResourceAllocation information element |
| --- |

| | | |
| --- | --- | --- |
| PUSCH-TimeDomainResourceAllocationList ::= | SEQUENCE (SIZE(1..maxNrofUL-Allocations)) OF PUSCH- | |
| TimeDomainResourceAllocation | | |
| PUSCH-TimeDomainResourceAllocation ::= | SEQUENCE { | |
|   k2 | INTEGER(0..32) | OPTIONAL,  -- Need S |
|   mapping Type | ENUMERATED {typeA, typeB}, | |
|   startSymbolAndLength | INTEGER (0..127) | |
| } | | |
| PUSCH-Allocation-r16 ::= | SEQUENCE { | |
|   mappingType-r16 | ENUMERATED | OPTIONAL,  -- |
| | {typeA, typeB} | Cond NotFormat01- |
| 02-Or-TypeA | | |
|   startSymbolAndLength-r16 | INTEGER (0..127) | OPTIONAL,  -- Cond |
| | | NotFormat01-02-Or-TypeA |
|   startSymbol-r16 | INTEGER (0..13) | OPTIONAL,  -- Cond RepTypeB |
|   length-r16 | INTEGER (1..14) | OPTIONAL,  -- Cond RepTypeB |
|   numberOfRepetitions-r16 | ENUMERATED {n1, n2, n3, | OPTIONAL,  -- Cond |
| | n4, n7, n8, n12, n16} | |
| Format01-02 | | |
|   ... | | |
| } | | |

In Table 9, k2 denotes PDCCH-to-PUSCH timing (e.g., a slot offset between DCI and scheduled PUSCH) in units of slots, mappingType may denote a PUSCH mapping type, startSymbolAndLength, StartSymbol, or length may denote information on a start symbol or a length of the PUSCH, and numberOfRepetitions may denote the number of repetitions applied to PUSCH transmission.

The aforementioned parameters are merely examples and are not limited thereto, and of course, equal or substantially similar parameters may be further included.

The BS may indicate at least one entry in the TDRA information table to the terminal via L1 signaling (e.g., DCI) (e.g., the indication may be made via "TDRA" in DCI). The terminal may acquire the TDRA information for the PDSCH or PUSCH, based on the DCI received from the BS.

Hereinafter, transmission of a UL data channel (e.g., a PUSCH) in the 5G system will be described. PUSCH transmission may be dynamically scheduled by a UL grant in the DCI (e.g., dynamic grant (DG)-PUSCH) or may be scheduled by configured grant (CG) Type 1 or CG Type 2 (e.g., CG-PUSCH). Dynamic scheduling for a PUSCH transmission may be indicated by, e.g., DCI format 0_0 or 0_1.

PUSCH transmission of CG type 1 may be configured semi-statically based on configuredGrantConfig including rrc-ConfiguredUplinkGrant in Table 10, via higher-layer signaling, without receiving a UL grant in DCI. PUSCH transmission of CG type 2 may be scheduled semi-persistently based on a UL grant in DCI after receiving configuredGrantConfig including no rrc-ConfiguredUplinkGrant in Table 10 via higher-layer signaling.

When a PUSCH transmission is scheduled by a CG, parameters applied to the PUSCH transmission may be configured based on configuredGrantConfig which is higher-layer signaling in Table 10, excluding specific parameters (e.g., dataScramblingIdentityPUSCH, txConfig, codebookSubset, maxRank, or scaling of UCI-OnPUSCH) provided via pusch-Config in Table 11, which is higher layer signaling. For example, if the terminal acquires transformPrecoder in configuredGrantConfig which is higher-layer signaling in Table 10, the terminal may apply tp-pi2BPSK in pusch-Config of Table 11 to PUSCH transmission operated by the CG.

The aforementioned parameters are merely examples and are not limited thereto, and of course, equal or substantially similar parameters may be further included.

TABLE 10

| ConfiguredGrantConfig |
| --- |

| | | |
| --- | --- | --- |
| ConfiguredGrantConfig ::= | SEQUENCE { | |
|   frequencyHopping | ENUMERATED (intraSlot, interSlot) | OPTIONAL, -- Need S, |
|   cg-DMRS-Configuration | DMRS-UplinkConfig, | |
|   mcs-Table | ENUMERATED {qam256, qam64LowSE} | OPTIONAL, -- Need S |
|   mcs-TableTransformPrecoder | ENUMERATED {qam256, qam64LowSE} | OPTIONAL, -- Need S |
|   uci-OnPUSCH | SetupRelease { CG-UCI-OnPUSCH } | OPTIONAL, -- Need M |
|   resourceAllocation | ENUMERATED { resourceAllocation Type0, resourceAllocationType1, dynamicSwitch }, | |
|   rbg-Size | ENUMERATED (config2) | OPTIONAL, -- Need S |
|   powerControlLoopToUse | ENUMERATED (n0, n1}, | |
|   p0-PUSCH-Alpha | P0-PUSCH-AlphaSetId, | |
|   transformPrecoder | ENUMERATED {enabled, disabled) | OPTIONAL. -- Need S |
|   nrofHARQ-Processes | INTEGER(1..17), | |
|   repK | ENUMERATED (n1, n2, n4, n8), | |
|   repK-RV | ENUMERATED (s1-0231, s2-0303, s3-0000} | OPTIONAL, -- Need R |
|   periodicity | ENUMERATED { | |
|   sym2, sym7, sym1x14, sym2x14, sym4x14, sym5x14, sym8x14, sym10x14, sym17x14, sym20x14, | | |
|   sym32x14, sym40x14, sym64x14, sym80x14, sym128x14, sym170x14, sym256x14, sym320x14, sym512x14, | | |
|   sym640x14, sym1024x14, sym1280x14, sym2560x14, sym5120x14, | | |
|   sym6, sym1x12, sym2x12, sym4x12, sym5x12, sym8x12, sym10x12, sym17x12, sym20x12, sym32x12, | | |
|   sym40x12, sym64x12, sym80x12, sym128x12, sym170x12, sym256x12, sym320x12, sym512x12, sym640x12, | | |
|   sym1280x12, sym2560x12 | | |

TABLE 10-continued

| ConfiguredGrantConfig | | |
|---|---|---|
| }, | | |
| configuredGrantTimer | INTEGER (1..64) | OPTIONAL,  -- Need R |
| rrc-ConfiguredUplinkGrant | SEQUENCE { | |
| timeDomainOffset | INTEGER (0..5119), | |
| timeDomainAllocation | INTEGER (0..16), | |
| frequencyDomainAllocation | BIT STRING (SIZE(18)), | |
| antennaPort | INTEGER (0..31), | |
| dmrs-SeqInitialization | INTEGER (0..1) | OPTIONAL,  -- Need R |
| precodingAndNumberOfLayers | INTEGER (0..63), | |
| srs-ResourceIndicator | INTEGER (0..16) | OPTIONAL,  -- Need R |
| mcsAndTBS | INTEGER (0..31), | |
| frequencyHoppingOffset | INTEGER (1..maxNrofPhysicalResourceBlocks-1) | OPTIONAL,  -- Need R |
| pathlossReferenceIndex | INTEGER (0..maxNrofPUSCH-PathlossReferenceRSs-1), | |
| ... | | |
| } | | OPTIONAL,  -- Need R |
| ... | | |
| } | | |

A DMRS antenna port for PUSCH transmission may be the same as an antenna port for a sounding RS (SRS) transmission. A PUSCH transmission may conform to each of a codebook-based transmission method and a non-codebook-based transmission method, depending on whether a value of txConfig in pusch-Config of Table 7, which is A PUSCH transmission may be performed based on a single antenna port. The terminal may not expect scheduling for PUSCH transmission via DCI format 0_0, within a BWP for which a PUCCH resource including pucch-spatialRelationInfo is not configured. If the terminal is not configured with txConfig in pusch-Config of Table 11, the terminal may not expect to be scheduled via DCI format 0_1.

TABLE 11

| PUSCH-Config | | |
|---|---|---|
| PUSCH-Config :== | SEQUENCE { | |
| dataScramblingIdentityPUSCH | INTEGER (0..1023) | OPTIONAL,  -- Need S |
| txConfig | ENUMERATED {codebook, nonCodebook} | OPTIONAL,  -- Need S |
| dmrs-UplinkForPUSCH-MappingTypeA | SetupRelease { DMRS-UplinkConfig } | OPTIONAL,  -- Need M |
| dmrs-UplinkForPUSCH-MappingTypeB | SetupRelease { DMRS-UplinkConfig } | OPTIONAL,  -- Need M |
| pusch-PowerControl | PUSCH-PowerControl | OPTIONAL,  -- Need M |
| frequencyHopping | ENUMERATED {intraSlot, interSlot} | OPTIONAL,  -- Need S |
| frequencyHoppingOffsetLists | SEQUENCE (SIZE (1..4) OF INTEGER | |
| | (1..maxNrofPhysicalResourceBlocks-1) | |
| OPTIONAL,  -- Need M | | |
| resourceAllocation | ENUMERATED { resourceAllocationType0, | |
| | resourceAllocationType1, dynamicSwitch}, | |
| pusch-TimeDomainAllocationList | SetupRelease | { PUSCH-TimeDomainResourceAllocationList } |
| OPTIONAL,  -- Need M | | |
| pusch-AggregationFactor | ENUMERATED { n2, n4, n8 } | OPTIONAL,  -- Need S |
| mcs-Table | ENUMERATED {qam256, qam64LowSE} | OPTIONAL,  -- Need S |
| mcs-TableTransformPrecoder | ENUMERATED {qam256, qam64LowSE; | OPTIONAL,  -- Need S |
| transformPrecoder | ENUMERATED {enabled, disabled} | OPTIONAL,  -- Need S |
| codebookSubset | ENUMERATED {fullyAndPartialAndNonCoherent, | |
| | partialAndNonCoherent,noncoherent} | |
| | OPTIONAL, -- Cond codebookBased | |
| maxRank | INTEGER (1..4) | OPTIONAL, -- |
| | | Cond codebookBased |
| rbg-Size | ENUMERATED { config2} | OPTIONAL,  -- Need S |
| uci-OnPUSCH | SetupRelease { UCI-OnPUSCH} | OPTIONAL,  -- Need M |
| tp-pi2BPSK | ENUMERATED {enabled} | OPTIONAL,  -- Need S |
| ... | | |
| } | | | higher signaling, corresponds to "codebook" or corresponds to "nonCodebook". As described above, a PUSCH transmission may be dynamically scheduled via DCI format 0_0 or 0_1, and may be semi-statically configured by a CG.

If the terminal is indicated with scheduling for a PUSCH transmission via DCI format 0_0, the terminal may perform beam configuration for the PUS CH transmission, by using pucch-spatialRelationInfoID corresponding to a UE-specific (dedicated) PUCCH resource having a lowest ID with an activated UL BWP in a serving cell.

A codebook-based PUSCH transmission may be dynamically scheduled via DCI format 0_0 or 0_1, and may operate semi-statically by a CG. If a codebook-based PUSCH transmission is dynamically scheduled by DCI format 0_1 or configured semi-statically by the CG, the terminal may determine a precoder for the PUSCH transmission, based on an SRS resource indicator (SRI), a transmission precoding matrix indicator (TPMI), and a transmission rank (e.g., the number of PUS CH transmission layers).

The SRI may be given via a field, SRI, in DCI or may be configured via srs-ResourceIndicator, which is higher signaling. The terminal may be configured with at least one SRS resource during codebook-based PUSCH transmission, and for example, up to two SRS resources may be configured. When the terminal is provided with the SRI via DCI, an SRS resource indicated by SRI may refer to an SRS resource corresponding to the SRI from among SRS resources transmitted before a PDCCH including the SRI. In addition, the TPMI and the transmission rank may be given via a field, precoding information and number of layers, in DCI or may be configured via precodingAndNumberOfLayers, which is higher signaling. The TPMI may be used to indicate the precoder applied to PUSCH transmission.

The precoder to be used for PUSCH transmission may be selected from a UL codebook having the same number of antenna ports as a value of nrofSRS-Ports in SRS-Config which is higher signaling. In a codebook-based PUSCH transmission, the terminal may determine a codebook subset, based on codebookSubset in pusch-Config, which is higher signaling, and the TPMI. The codebookSubset in pusch-Config, which is higher signaling, may be configured to be one of "fullyAndPartialAndNonCoherent", "partialAndNonCoherent", or "nonCoherent", based on UE capability reported to the BS by the terminal.

If a terminal has reported "partialAndNonCoherent" based on a UE capability, the terminal may not expect that a value of codebookSubset, which is higher signaling, is configured to be "fullyAndPartialAndNonCoherent". In addition, if the terminal has reported "nonCoherent" based on the UE capability, the terminal may not expect that the value of codebookSubset, which is higher signaling, is configured to be "fullyAndPartialAndNonCoherent" or "partialAndNonCoherent". If nrofSRS-Ports in SRS-ResourceSet, which is higher signaling, indicates two SRS antenna ports, the terminal may not expect that the value of codebookSubset, which is higher signaling, is configured to be "partialAndNonCoherent".

The terminal may be configured with one SRS resource set, in which a value of usage in SRS-ResourceSet that is higher signaling is configured to "codebook", and one SRS resource in the corresponding SRS resource set may be indicated via the SRI. If multiple SRS resources are configured in the SRS resource set in which the usage value in SRS-ResourceSet that is higher signaling is configured to be "codebook", the terminal may expect that the value of nrofSRS-Ports in SRS-Resource that is higher signaling is configured to be the same for all SRS resources.

The terminal may transmit, to the BS, one or multiple SRS resources included in the SRS resource set in which the usage value is configured to be "codebook" according to higher-level signaling. The BS may select one of the SRS resources transmitted by the terminal, and may indicate the terminal to perform PUSCH transmission by using transmission beam information of the SRS resource. In a codebook-based PUSCH transmission, the SRI may be used as information for selection of an index of one SRS resource, and may be included in DCI. Additionally, the BS may add, to DCI, information indicating the rank and TPMI to be used for PUSCH transmission by the terminal, so as to transmit the same. The terminal may, by using the SRS resource indicated by the SRI, apply a precoder indicated by the TPMI and rank indicated based on a transmission beam of the SRS resource and perform PUSCH transmission.

A non-codebook-based PUSCH transmission may be dynamically scheduled via DCI format 0_0 or 0_1 and may operate semi-statically by the CG. If at least one SRS resource is configured in an SRS resource set in which the value of usage in SRS-ResourceSet that is higher signaling is configured to be "nonCodebook", the terminal may be scheduled for non-codebook-based PUS CH transmission via DCI format 0_1.

For the SRS resource set in which the value of usage in SRS-ResourceSet that is higher signaling is configured to be "nonCodebook", the terminal may be configured with a non-zero power (NZP) CSI-RS resource associated with one SRS resource set. The terminal may perform calculation on a precoder for SRS transmission via measurement on the NZP CSI-RS resource configured in association with the SRS resource set. If a difference between a last reception symbol of an aperiodic NZP CSI-RS resource associated with the SRS resource set and a first symbol of aperiodic SRS transmission in the terminal is less than a specific number of symbols (e.g., 42 symbols), the terminal may not expect updating of information on the precoder for SRS transmission.

If a value of resourceType in SRS-ResourceSet, which is higher signaling, is configured to be "aperiodic", the NZP CSI-RS associated with SRS-ResourceSet may be indicated by an SRS request, which is a field in DCI format 0_1 or 1_1.

A case in which the NZP CSI-RS resource associated with SRS-ResourceSet is an aperiodic NZP CSI resource, and a value of the SRS request which is the field in DCI format 0_1 or 1_1 is not "00" may indicate the presence of the NZP CSI-RS resource associated with SRS-ResourceSet. The DCI may indicate neither a cross carrier nor cross BWP scheduling. If the value of the SRS request indicates the presence of the NZP CSI-RS, the NZP CSI-RS may be located in a slot via which a PDCCH including the SRS request field is transmitted. TCI states configured in scheduled subcarriers may not be configured to be QCL-TypeD.

If a periodic or semi-persistent SRS resource set is configured, an NZP CSI-RS associated with the SRS resource set may be indicated via associated CSI-RS in SRS-ResourceSet that is higher signaling. For a non-codebook-based transmission, the terminal may not expect that spatialRelationInfo, which is higher signaling for the SRS resource, and associatedCSI-RS in SRS-ResourceSet, which is higher signaling, are configured together.

If multiple SRS resources are configured, the terminal may determine a transmission rank and a precoder to be applied to PUSCH transmission, based on an SRI indicated by the BS. The SRI may be indicated via the field, SRI, in DCI or may be configured via srs-ResourceIndicator, which is higher signaling. Like the aforementioned codebook-based PUSCH transmission, when the terminal is provided with the SRI via DCI, an SRS resource indicated by the SRI may refer to an SRS resource corresponding to the SRI from among SRS resources transmitted before a PDCCH including the SRI. The terminal may use one or multiple SRS resources for SRS transmission, and the maximum number of SRS resources capable of simultaneous transmission in the same symbol within one SRS resource set may be determined by UE capability reported to the BS by the terminal. The SRS resources that the terminal simultaneously transmits occupy the same RB. The terminal may configure one SRS port for each SRS resource. Only one SRS resource set, in which the value of usage in SRS-ResourceSet that is higher signaling is configured to be "nonCodebook", may be configured, and configuration of up to 4 SRS resources for non-codebook-based PUSCH transmission may be possible.

The BS may transmit one NZP CSI-RS associated with the SRS resource set to the terminal. When receiving the NZP CSI-RS, the terminal may calculate, based on a measurement result, a precoder to be used when one or multiple SRS resources in the SRS resource set are transmitted. The terminal may apply the calculated precoder when transmitting, to the BS, one or multiple SRS resources in the SRS resource set in which usage is configured to be "nonCodebook". The BS may select one or multiple SRS resources from among received one or multiple SRS resources.

In a non-codebook-based PUSCH transmission, the SRI may include an index which may represent one or a combination of multiple SRS resources, and the SRI may be included in DCI. The number of SRS resources indicated by the SRI transmitted by the BS may be the number of PUSCH transmission layers, and the terminal may transmit the PUSCH by applying, to each layer, the precoder applied to SRS resource transmission.

In a 5G system, two types of repeated UL data channel transmission methods (e.g., repeated PUSCH transmission type A and repeated PUSCH transmission type B) and transport block (TB) processing over multi-slot PUSCH (TBoMS) for transmitting a single TB via multi-PUSCH transmission over multiple slots may be supported. In addition, the terminal may be configured with one of repeated PUSCH transmission type A or B via higher-layer signaling. In addition, the terminal may be configured with "numberOfSlotsTBoMS" via a resource allocation table so as to transmit TBoMS.

Repeated PUSCH Transmission Type A

As described above, within one slot, a start symbol and a length of a UL data channel are determined by a TDRA method, and the BS may transmit the number of repeated transmissions, to the terminal, via higher-layer signaling (e.g., RRC signaling) or L1 signaling (e.g., DCI). The number N of slots configured via numberOfSlotsTBoMS to determine a TB size (TBS) may be 1.

The terminal may repeatedly transmit a UL data channel, which has the same start symbol and length as the configured UL data channel, in consecutive slots, based on the number of repeated transmissions received from the BS. If at least one symbol among symbols in a slot configured to be DL by the BS for the terminal or in a slot for repeated UL data channel transmission configured for the terminal is configured for DL, the terminal may skip UL data channel transmission in the corresponding slot. For example, the terminal may not transmit the UL data channel within the number of repeated UL data channel transmissions. However, the terminal that supports Rel-17 repeated UL data transmission may determine that a slot capable of repeated UL data transmission is an available slot, and may count the number of transmissions during repeated UL data channel transmission in the slot determined to be an available slot. If repeated UL data channel transmission in a slot determined to be an available slot is skipped, the terminal may perform repeated transmission via a slot available for transmission after postponing. By using Table 12 below, a redundancy version may be applied according to a redundancy version pattern configured for each n-th PUS CH transmission occasion.

Repeated PUSCH Transmission Type B

As described above, within one slot, a start symbol and a length of a UL data channel may be determined by a TDRA method. The BS may transmit numberofrepetitions, which is the number of repeated transmissions, to the terminal via higher-layer signaling (e.g., RRC signaling) or L1 signaling (e.g., DCI). The number N of slots configured via numberOfSlotsTBoMS to determine a TBS may be 1.

Nominal repetition of the UL data channel may be determined as follows, based on the configured start symbol and length of the UL data channel. Here, the nominal repetition may indicate a resource of a symbol configured by the BS for repeated PUSCH transmission, and the terminal may determine a resource available for UL in the configured nominal repetition. In this case, a slot in which an n-th nominal repetition starts may be given by $$K_s + \left\lfloor \frac{S + n \cdot L}{N_{symb}^{slot}} \right\rfloor,$$

and a symbol with a nominal repetition starting in the start slot may be given by $$\mathrm{mod}\left(S + n \cdot L,\, N_{symb}^{slot}\right).$$

A slot in which the n-th nominal repetition ends may be given by $$K_s + \left\lfloor \frac{S + (n+1) \cdot L - 1}{N_{symb}^{slot}} \right\rfloor,$$

and a symbol with a nominal repetition ends in the last slot may be given by $$\mathrm{mod}\left(S + (n+1) \cdot L - 1,\, N_{symb}^{slot}\right).$$

Here, n=0, . . . , numberofrepetitions-1, S may denote the configured start symbol of the UL data channel, and L may denote the configured symbol length of the UL data channel $K_s$ may denote a slot in which PUSCH transmission starts, and $$N_{symb}^{slot}$$

may denote the number of symbols per slot.

The terminal may determine an invalid symbol for repeated PUSCH transmission type B. A symbol configured for DL by tdd-UL-DL-ConfigurationCommon or tdd-UL-DL-ConfigurationDedicated may be determined to be an invalid symbol for repeated PUSCH transmission type B. Additionally, an invalid symbol may be configured based on a higher-layer parameter (e.g., InvalidSymbolPattern). For example, a higher-layer parameter (e.g., InvalidSymbolPattern) may provide a symbol-level bitmap in one slot or over two slots so that an invalid symbol may be configured. An indication of 1 in a bitmap may represent an invalid symbol. In addition, a period and a pattern of the bitmap may be configured via a higher-layer parameter (e.g., periodicity-AndPattern). If the higher-layer parameter (e.g., InvalidSymbolPattern) is configured, and parameter InvalidSymbolPatternIndicator-ForDCIFormat0_1 or parameter InvalidSymbolPatternIndicator-ForDCIFormat0_2 indicates 1, the terminal may apply an invalid symbol pattern, and if the parameter indicates 0, the terminal may not apply the invalid symbol pattern. Alternatively, if the higher-layer parameter (e.g., InvalidSymbolPattern) is configured, and parameter InvalidSymbolPatternIndicator-ForDCIFormat0_1 or parameter InvalidSymbolPatternIndicator-ForDCIFormat0_2 is not configured, the terminal may apply the invalid symbol pattern.

After invalid symbols are determined in respective nominal repetitions, the terminal may consider, as valid symbols, symbols other than the determined invalid symbols. If respective nominal repetitions include one or more valid symbols, the nominal repetitions may include one or more actual repetitions. Here, respective actual repetitions may indicate symbols actually used for repeated PUSCH transmission from among symbols configured to be the configured nominal repetitions, and may include a consecutive set of valid symbols available for repeated PUSCH transmission type B within one slot. The terminal may skip actual repetition transmission if an actual repetition having one symbol is configured to be valid, except for the configured symbol length of the UL data channel being 1 (L=1). By using Table 12 below, a redundancy version may be applied according to a redundancy version pattern configured for each n-th actual repetition.

TBoMS

As described above, within one slot, a start symbol and a length of an UL data channel may be determined by a TDRA method. The BS may transmit the number of repeated transmissions, to the terminal via higher-layer signaling (e.g., RRC signaling) or L1 signaling (e.g., DCI). A TBS may be determined using an N value greater than or equal to 1, which is the number of slots configured via numberOfSlotsTBoMS.

The terminal may transmit a UL data channel, which has the same start symbol and length as the configured UL data channel, in consecutive slots, based on the number of repeated transmissions and the number of slots for determination of the TBS received from the BS. If at least one symbol among symbols in a slot configured to be DL by the BS for the terminal or in a slot for repeated UL data channel transmission configured for the terminal is configured for DL, the terminal may skip UL data channel transmission in the corresponding slot. For example, even if the UL data channel is included in the number of repeated transmissions, the terminal may not transmit the same.

On the other hand, the terminal that supports Rel-17 repeated UL data transmission may determine that a slot capable of repeated UL data transmission is an available slot, and may count the number of transmissions during repeated UL data channel transmission in the slot determined to be an available slot. If repeated UL data channel transmission in a slot determined to be an available slot is skipped, the terminal may perform repeated transmission via a slot available for transmission after postponing.

As shown in Table 12 below, a redundancy version may be applied according to a redundancy version pattern configured for each n-th PUSCH transmission occasion.

If AvailableSlotCounting is configured to be enabled for the terminal, the terminal may determine an available slot for type A repeated PUSCH transmission and repeated TBoMS PUSCH transmission, based on tdd-UL-DL-ConfigurationCommon, tdd-UL-DL-ConfigurationDedicated, ssb-PositionsInBurst, and a TDRA information field value. For example, if, in a slot for PUSCH transmission, at least one symbol configured via TDRA for PUSCH overlaps at least one symbol having a purpose other than UL transmission, the slot may be determined to be an unavailable slot.

FIG. 10 illustrates a method of reconfiguring SSB transmission via dynamic signaling, according to an embodiment. More specifically, FIG. 10 illustrates a method 1001 of reconfiguring SSB transmission via bitmap-based group/cell common DCI.

Referring to FIG. 10, a terminal may be configured with ssb-PositionsInBurst="11110000" 1002 from a BS via higher-layer signaling (SIB1 or ServingCellConfigCommon). Up to two SSBs at an SCS of 30 kHz may be transmitted within 0.5 ms (or corresponding to a length of one slot when one slot includes 14 OFDM symbols), and accordingly, the terminal may receive four SSBs within 1 ms (or corresponding to a length of two slots when one slot includes 14 OFDM symbols). In this case, the BS may reduce the density of SSB transmission for energy reduction. The BS may reconfigure SSB transmission configuration information by broadcasting bitmap "1010xxxx" 1004 via group/cell common DCI 1003 having a network energy saving-radio network temporary identifier (nwes-RNTI) (or es-RNTI). In this case, transmission of SS block #1 1005 and SS block #3 1006 may be canceled based on the bitmap 1004 configured via the group/cell common DCI.

According to an embodiment, the BS may reconfigure ssb-periodicity configured via higher-layer signaling, based on the group/cell common DCI. In addition, timer information for indicating a time point to apply the group/cell common DCI may be additionally configured. The BS may transmit an SSB, based on SSB transmission information reconfigured via group/cell common DCI during the configured timer. When the timer expires, the BS may operate based on the SSB transmission information configured via existing higher-layer signaling. The BS may change a configuration from a normal mode to an energy saving mode via the timer, and may reconfigure the SSB configuration information caused thereby.

The BS may configure, as offset and duration information for the terminal, the application time point and period of the SSB configuration information reconfigured via the group/cell common DCI. In this case, the terminal may not monitor the SSB during the duration from the moment the group/cell common DCI is received and the offset is applied.

TABLE 12

| rv$_{id}$ to be applied to n$^{th}$ transmission occasion (repetition Type A) or TB processing over multiple slots) or n$^{th}$ actual repetition (repetition Type B) | | | |
|---|---|---|---|
| rv$_{id}$ indicated by the DCI scheduling the PUSCH | ((n-(n mod N))/N) mod 4 = 0 | ((n-(n mod N))/N) mod 4 = 0 | ((n-(n mod N))/N) mod 4 = 0 | ((n-(n mod N))/N) mod 4 = 0 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 11:
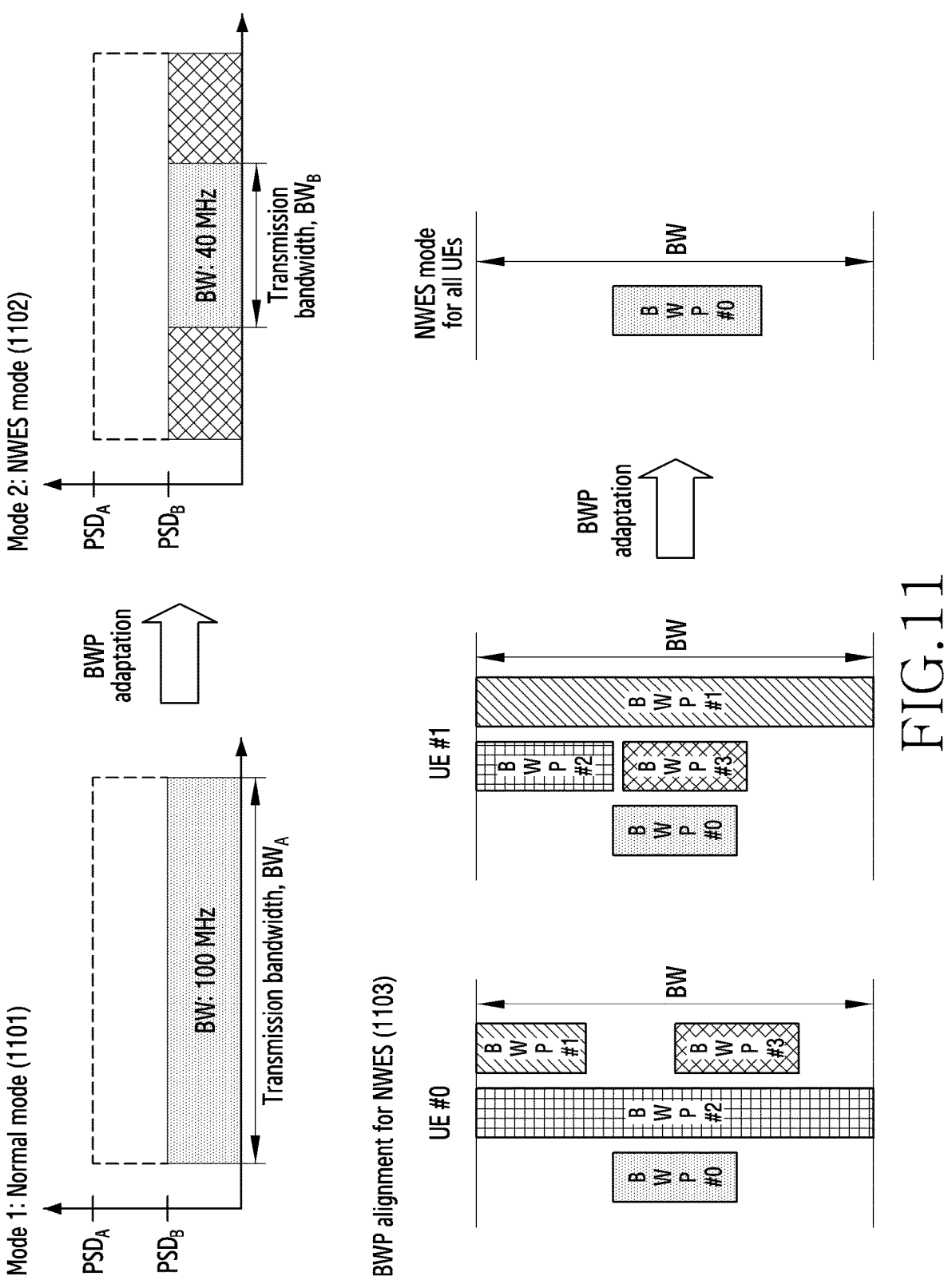
FIG. 11 illustrates a method of reconfiguring a bandwidth (BW) and a BW part (BWP) via dynamic signaling, according to an embodiment.

FIG. 11 illustrates a method of reconfiguring a BW and a BWP via dynamic signaling, according to an embodiment.

Referring to FIG. 11, a terminal may operate based on a BWP (or BW) activated via higher-layer signaling and L1 signaling from a BS, in reference numeral 1101. For example, the terminal may operate via full BW of 100 MHz with a fixed power $PSD_B$ (power spectral density). In this case, for energy saving, the BS may adjust the BW and BWP so as to activate a narrower BW of 40 MHz for the terminal with the same power $PSD_B$, in reference numeral 1102.

The adjustment of the BW or BWP for energy saving by the BS may be configured to equally match the UE-specifically configured BWP and BW, via group common DCI and cell-specific DCI, in reference numeral 1103. For example, UE #0 and UE #1 may have different BWP configurations and locations. In this case, in order for the BS to save energy by reducing BWs used, BWs and BWPs of all terminals may be configured equally to one.

One or more BWPs or BWs in the operation for energy saving may be configured, which may be used to configure a UE group-specific BWP.

Figure 12:
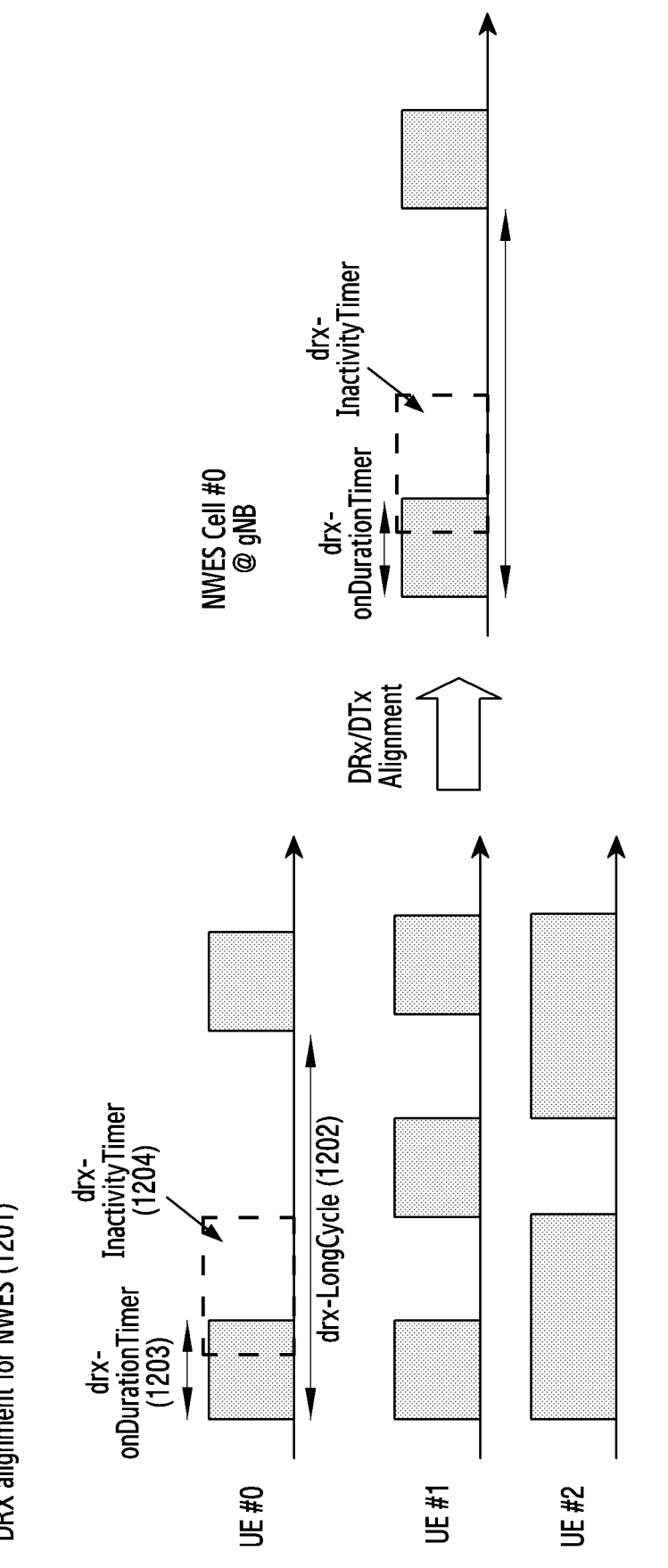
FIG. 12 illustrates a method of reconfiguring discontinuous reception (DRX) via dynamic signaling, according to an embodiment.

FIG. 12 illustrates a method of reconfiguring DRX via dynamic signaling, according to an embodiment.

Referring to FIG. 12, a BS may UE-specifically configure DRX via higher-layer signaling. For example, the BS may configure different drx-LongCycle, drx-ShortCycle, drx-on-DurationTimer, and drx-InactivityTimer for each terminal. For energy saving, the BS may configure the UE-specific DRX configuration to be UE group-specific or cell-specific via L1 signaling, in reference numeral 1201. Accordingly, the BS may achieve the same energy saving effect as that of power saving via DRX by the terminal.

Figure 13:
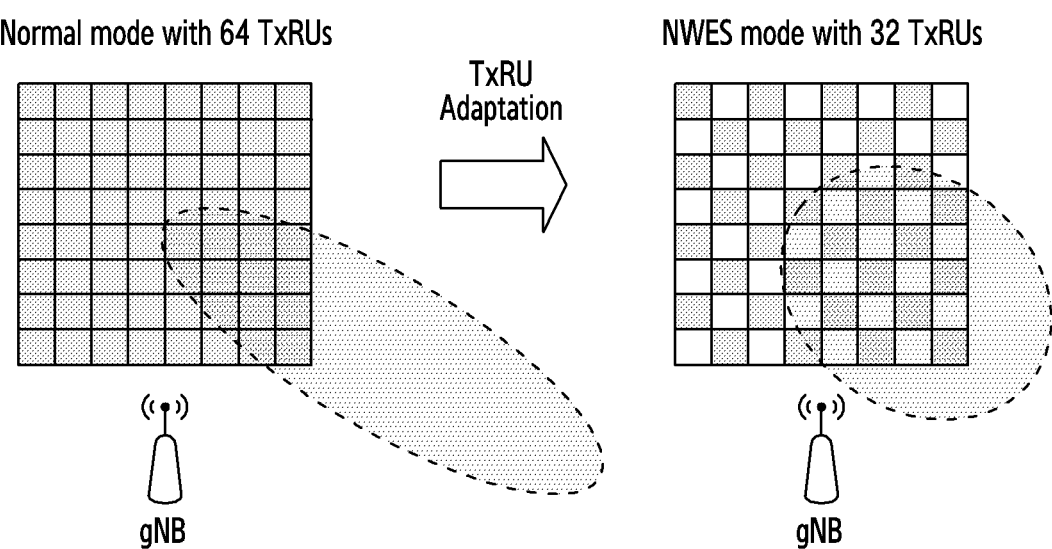
FIG. 13 illustrates an antenna adaptation method of a BS for energy saving, according to an embodiment.

FIG. 13 illustrates an antenna adaptation method of a BS for energy saving, according to an embodiment.

Referring to FIG. 13, for energy saving, a BS may adjust a Tx antenna port per resource unit. Since a power amplifier (PA) of the BS accounts for most of energy consumption of the BS, the BS may turn off a Tx antenna to save energy, in reference numeral 1301. In this case, in order to determine whether the Tx antenna can be turned off, the BS may adjust the number of activated Tx antennas for each UE group or UE by considering at least one of RS received power (RSRP), channel quality information (CQI), or RS received quality (RSRQ) of a terminal, etc. The BS may transmit a Tx, based on the adjusted number of Tx antennas. In this case, the BS may configure beam information, RS information, etc., according to on/off of the antenna for the terminal via DCI signaling. In addition, the BS may configure different antenna information for each BWP so as to reconfigure the antenna information according to a BWP change.

Figure 14:
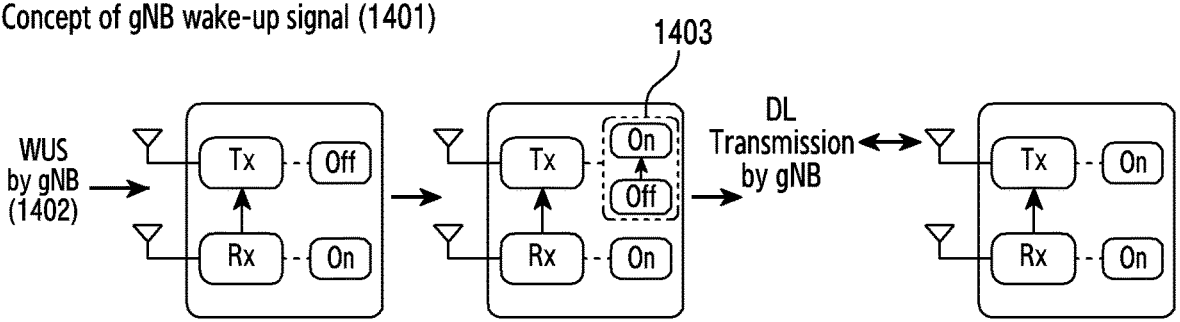
FIG. 14 illustrates an operation of a BS according to a gNB wake-up signal, according to an embodiment.

FIG. 14 illustrates an operation of a BS according to a gNB wake-up signal, according to an embodiment.

Referring to FIG. 14, for energy saving, a BS may maintain a transmission end in an off (or inactive) state during a BS sleep mode. The BS may receive a gNB wake-up signal 1402 from a terminal to activate the sleep mode of the BS. When the BS receives a wake-up signal (WUS) from the terminal via a reception end, the Tx end may be changed to an on (or active) state 1403. The BS may perform DL transmission to the terminal. In this case, the BS may proceed with synchronization after Tx on and transmit control and data signals. In addition, the gNB WUS may include various UL signals (e.g., a physical random access channel (PRACH), a scheduling request (SR) PUCCH, a PUCCH including acknowledgement (ACK), etc.).

In accordance with the methods described above, the BS may save energy, and the terminal may improve latency at the same time.

In addition, the methods illustrated in FIG. 10 to FIG. 14 are not limited to the disclosed contents and may be simultaneously configured via at least one combination thereof.

In accordance with the embodiments of the disclosure, DTX methods for reducing energy consumption of a BS are described, and a DTX activation/inactivation configuration method and a DTX configuration method via higher-layer signaling and dynamic L1 signaling are described. In addition, a synchronization method for performing DTX is described.

Figure 15:
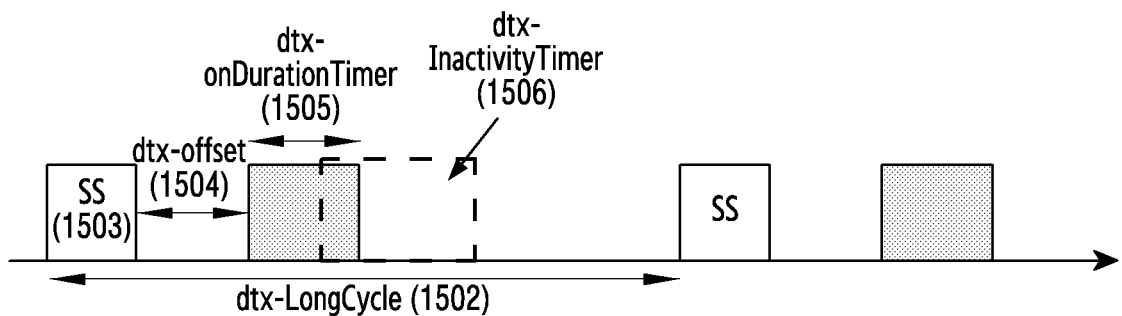
FIG. 15 illustrates a DTX method for BS energy saving, according to an embodiment.

FIG. 15 illustrates a DTX method for BS energy saving, according to an embodiment.

Referring to FIG. 15, for energy saving, a BS may configure DTX via higher-layer signaling (e.g., a new SIB for DTX or RRC signaling) and L1 signaling (e.g., DCI). The BS may configure dtx-onDurationTimer 1505 for transmission of an RS for measurement for pathloss, beam management, RRM measurement, etc., or a PDCCH for scheduling of a DL shared channel (SCH) for DTX operation. The BS may configure an SS 1503 configuration information for synchronization before dtx-onDuration-Timer and dtx-InactivityTimer 1506 for the terminal to receive a PDSCH after receiving the PDCCH for scheduling of the DL SCH. The BS may configure dtx-offset 1504 for configuration of an offset between dtx-onDurationTimer after the SS, and dtx-(Long)Cycle 1502 for DTX to operate periodically based on the configuration information described above.

Multiple dtx-cycle values may be configured to include a long cycle or a short cycle. While DTX is being performed, the BS may configure the transmission end to be off (or inactive) and therefore a DL common channel (CCH), SCH, and DL RS may not be transmitted. For example, while DTX is being performed, the BS may transmit DL signals (PDCCH, PDSCH, RS, etc.) only in sections indicated by the SS, dtx-onDurationTimer, and dtx-InactivityTimer. As additional information on the configured SS, SS-gapbe-tweenBurst or the number of SS bursts may be additionally configured.

More specifically, according to terminal states (RRC connected, RRC Idle, or RRC inactive), the configuration information may be configured by one or a combination thereof.

For energy saving, the BS may configure configuration information on the DTX operation for the terminal in the RRC connected state.

The BS may configure DTX configuration information for the terminal via RRC signaling. For example, dtx-config below may be configured via RRC signaling.

The aforementioned parameters are merely examples and are not limited thereto, and of course, equal or substantially similar parameters may be further included.

TABLE 13

| DTx-Config-r18 ::= | SEQUENCE ( |
| dtx-onDurationTimer | CHOICE {ms1, ... }, |

TABLE 13-continued

| dtx-InactivityTimer | ENUMERATED {ms0, ..} |
| ss-resourceSet-r18 | CSI-SSB-ResourceSetId, |
| trs-ResouceSetConfig-r18 | SEQUENCE (SIZE (1..maxNrofTRS- |
| ResourceSets-r18) ) OF TRS-ResourceSet-r18 | OPTIONAL, -- Need R |
| ss-offset CHOICE {ms1, ... }, | |
| ... | |
| } | |

The BS may configure, via DTx-Config RRC configuration, configuration information for the DTX operation and RS configuration information for synchronization before DTX.

For energy saving, the BS may configure configuration information on the DTX operation for all terminals in the RRC connected and RRC Idle/Inactive states.

Using a new SIB, the BS may configure DTX operation configuration information for terminals in the RRC connected, RRC idle, and RRC inactive states and all terminals newly accessing a cell. For example, the terminal may be configured with DTX from the BS via SIBXX as shown below.

The aforementioned parameters are merely examples and are not limited thereto, and of course, equal or substantially similar parameters may be further included.

having a new RNTI (e.g., NWES-RNTI). DCI that the terminal receives from the BS may include information on a cell so as to enable simultaneous indication of one or multiple cells for the terminal supporting CA. The terminal may monitor the DCI received from the BS, via a Type3-PDCCH common search space (CSS) set configured via SearchSpace in PDCCH-Config having searchSpaceType=Common. The terminal may receive the DCI via Coreset0 when an SS is configured by an SSB. When the terminal is indicated to activate and inactivate DTX, the terminal may apply the DTX operation after a processing time from the last symbol of the received DCI.

A terminal may be configured to activate and inactivate a DTX operation, based on a medium access control (MAC) control element (CE) having a new extended logical channel ID (eLCID) received from the BS. The MAC CE may

TABLE 14

| SIBXX-IEs-r18 ::= | SEQUENCE { |
| dtx-on DurationTimer | CHOICE {ms1, ... }, |
| dtx-InactivityTimer | ENUMERATED { ms0, ..] |
| ss-resourceSet-r18 | CSI-SSB-ResourceSetId, |
| trs-ResouceSetConfig-r18 | SEQUENCE (SIZE (1..maxNrofTRS- |
| ResourceSets-r18) ) OF TRS-ResourceSet-r18 | OPTIONAL, -- Need R |
| ss-offset CHOICE {ms1, ... }, | |
| ... | |
| } | |

An SIB (i.e., SIBXX) may be broadcast from the BS so as to be configured for the terminal, and the terminal attempting initial access may receive SIBXX transmitted in a DTX period so as to determine whether DTX operates and perform an access procedure. In relation to whether SIBXX is updated, the terminal may be indicated whether SIB information is changed, via a paging message. Additionally, if DTX configuration information may be configured and changed via cell-specific or UE group-specific DCI (e.g., DCI scrambled cyclic redundancy check (CRC) with NWES-RNTI) for BS energy saving, then parameters of some or all of the contents described above may be included.

Terminals may be configured with configuration information for the DTX operation from the BS. In addition, configured DTX configuration values may be transmitted or received via a PUSCH/PUCCH or UE assistance information of the RRC connected terminal. Based on an RS for synchronization before the DTX operation, a CCH and SCH transmitted during the DTX operation may be QCLed. In addition, the configuration for the SS before the DTX operation may be included in MeasConfig so as to be configured.

A terminal may be configured with DTX configuration information from the BS via higher-layer signaling (e.g., RRC or SIB). Depending on a state, the terminal may be indicated to activate/inactivate the DTX operation, via one or a combination of various methods of the disclosure.

A terminal may be indicated to activate a DTX operation from a BS via cell-specific DCI or UE group specific-DCI include cell information and RS ID information of an SS for synchronization before DTX. For example, the MAC CE may have the following structure, and a size of the MAC CE may vary depending on the number of pieces of cell information.

TABLE 15

| $C_7$ | $C_6$ | $C_5$ | $C_4$ | $C_3$ | $C_2$ | $C_1$ | R |
|---|---|---|---|---|---|---|---|
| | | SS (e.g. SSB or TRS) $ID_1$ | | | | | |
| | | ... | | | | | |
| | | SS (e.g. SSB or TRS) $ID_N$ | | | | | |

As shown in Table 15, a MAC CE structure received by the terminal may include 7 pieces of cell information ($C_1$ to $C_7$) and RS ID information (R) of an SS in each activated cell. The MAC CE may include information to indicate activation and inactivation of the DTX operation in 1 octet. When supporting 32 cells, expansion may be made to 4 octets. For octet2 to octetN, the RS ID of SS for DTX in an activated cell may be configured. Using the MAC CE, the terminal may be configured with SS information and whether DTX is activated. The terminal may perform the DTX operation after receiving the MAC CE and after the processing time, and/or after transmitting a PUCCH including an ACK/NACK signal.

A terminal may be indicated to activate a DTX operation, based on DCI having a new RNTI or DCI having a P-RNTI. The terminal may monitor DCI via a new RNTI (e.g., NWES-RNTI) from the BS. Alternatively, the terminal may monitor DCI via Type2-PDCCH CSS configured via pagingSearchSpace in PDCCH-ConfigCommon for DCI format 1_0 having a P-RNTI. The terminal may receive the DCI via Coreset0 when an SS is configured by an SSB. The DCI received by the terminal may include information on a cell so as to enable simultaneous indication of one or multiple cells for the terminal supporting CA. When the terminal is indicated to activate and inactivate DTX, the terminal may apply the DTX operation after a processing time from the last symbol of the received DCI.

The BS may indicate activation and inactivation of the DTX operation via the methods described above, and the terminal may apply DTX via DCI or MAC CE configurations of the methods described above. In addition, the DTX operation may always be performed via RRC configuration or may always be performed by being configured with the DTX operation for each BWP. When the terminal is configured to perform a DTX operation regardless of whether the DTX operation is activated, the BS may identify this and may not receive indication information related to activation or inactivation of the DTX operation. Based on this, both the BS and the terminal may achieve energy saving.

Figure 16:
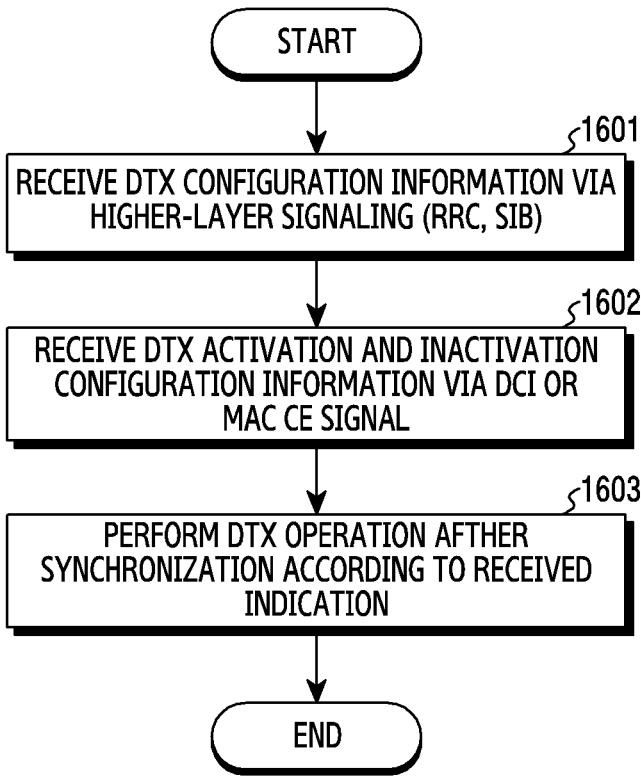
FIG. 16 is a flow chart illustrating operations of a terminal for an energy saving method, according to an embodiment.

FIG. 16 is a flow chart illustrating operations of a terminal for an energy saving method, according to an embodiment. Specifically, FIG. 16 illustrates a terminal performing the operations described in FIGS. 1 to 15 above.

Referring to FIG. 16, in step 1601, the terminal receives configuration information for a DTX operation from a BS via higher-layer signaling (e.g., RRC or SIB), e.g., as illustrated in FIG. 15.

In step 1602, based on the DTX configuration information, the terminal may be configured with whether to activate the DTX operation, from the BS via DCI or MAC CE signaling. The terminal may receive, from the BS, information for activation or inactivation of DTX illustrated in FIG. 15. Since the terminal may always perform the DTX operation via the RRC configuration received from the BS or always perform the DTX operation by being configured with the same for each BWP, step 1602 may be optional.

In step 1603, the terminal performs the DTX operation after synchronization. The DRX operation performed by the terminal may be performed via at least one of or a combination of at least one of the methods described above with reference to FIGS. 10 to 14.

Figure 17:
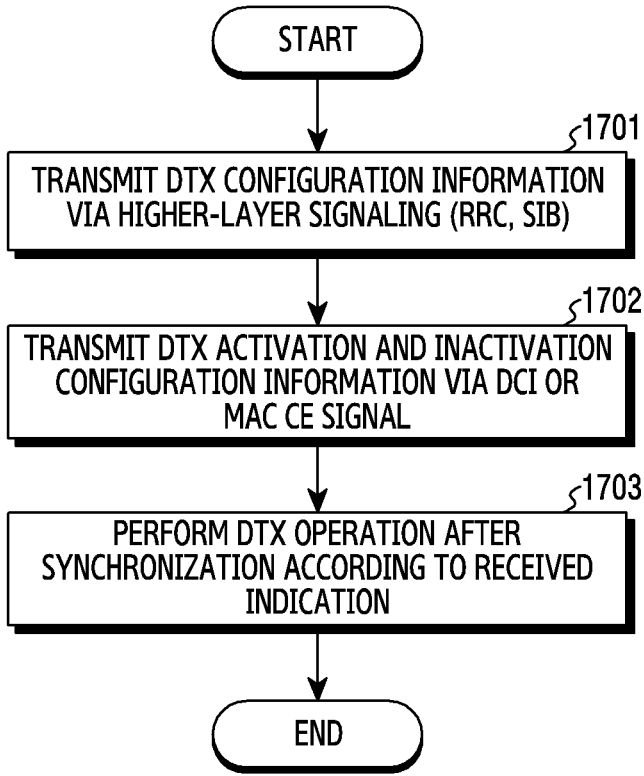
FIG. 17 is a flow chart illustrating operations of a BS for an energy saving method, according to an embodiment.

FIG. 17 is flow chart illustrating operations of a BS for an energy saving method, according to an embodiment. Specifically, FIG. 17 illustrates a BS performing the operations as described with reference to FIGS. 1 to 15.

Referring to FIG. 17, in step 1701, the BS transmits configuration information for a DTX operation to a terminal via higher-layer signaling (e.g., RRC or SIB), e.g., as illustrated in FIG. 15.

In step 1702, based on the DTX configuration information, the BS configures whether to activate the DTX operation, for the terminal via DCI or MAC CE signaling. Since the terminal may always perform the DTX operation via the RRC configuration received from the BS or always perform the DTX operation by being configured with the same for each BWP, step 1702 may be optional.

In step 1703, the BS performs the DTX operation after synchronization.

The DRX operation performed by the BS may be performed via at least one of or a combination of at least one of the methods described above with reference to FIGS. 10 to 14.

Figure 18:
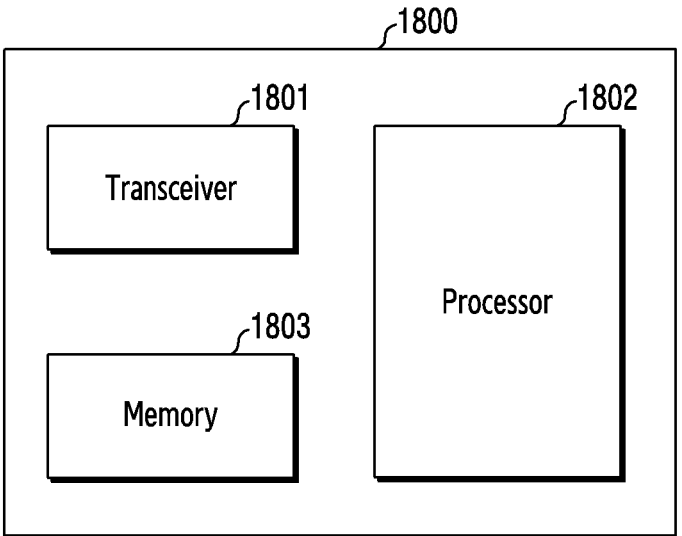
FIG. 18 illustrates a terminal, according to an embodiment.

FIG. 18 illustrates a terminal, according to an embodiment. Referring to FIG. 18, a terminal 1800 includes a transceiver 1801, a controller (e.g., a processor) 1802, and a storage unit (e.g., a memory) 1803. The transceiver 1801, the controller 802, and the storage unit 1803 of the terminal 1800 may operate according to at least one or a combination of methods corresponding to the aforementioned embodiments. However, the elements of the terminal 1800 are not limited to the described examples. For example, the terminal 1800 may include more or fewer elements compared to the aforementioned elements. In addition, the transceiver 1801, the controller 1802, and the storage unit 1803 may be implemented in the form of a single chip.

The transceiver 1801 may include a transmitter and a receiver. The transceiver 1801 may transmit signals to or receive signals from a BS. The signals transmitted to or received from the terminal may include control information and data. The transceiver 1801 may include an RF transmitter configured to perform up-conversion and amplification of a frequency of a transmitted signal, and an RF receiver configured to perform low-noise amplification of a received signal and perform down-conversion of a frequency. The transceiver 1801 may receive a signal through a radio channel, output the signal to the controller 1802, and transmit, through the radio channel, a signal output from the controller 1802.

The controller 1802 may control a series of procedures in which the terminal 1800 may operate according to the aforementioned embodiments of the disclosure. For example, the controller 1802 may perform or control a terminal operation for performing at least one or a combination of methods according to the embodiments of the disclosure. The controller 1802 may include at least one processor. For example, the controller 1802 may include a communication processor configured to perform control for communication and an application processor (AP) configured to control a higher layer (e.g., an application).

The storage unit 1803 may store control information (e.g., information on channel estimation using DMRSs transmitted on a PUSCH included in a signal acquired by the terminal 1800) or data, and may have an area for storing data required for controlling of the controller 1802 and data generated during controlling in the controller 1802.

Figure 19:
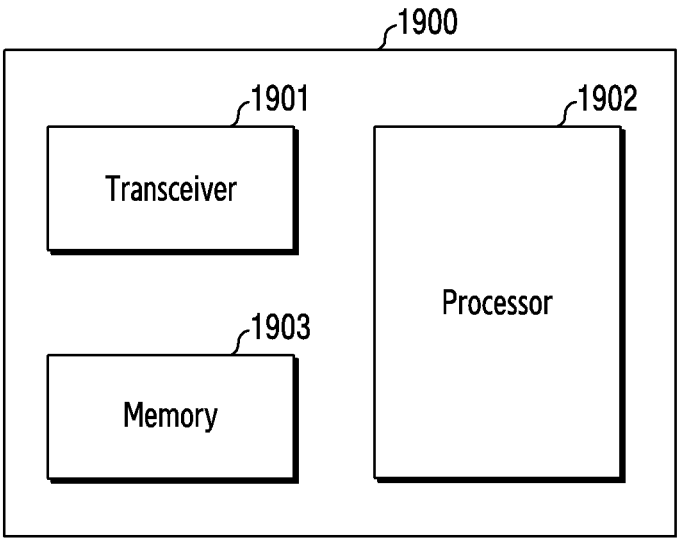
FIG. 19 illustrates a BS, according to an embodiment.

FIG. 19 illustrates a BS, according to an embodiment.

Referring to FIG. 19, a BS 1900 includes a transceiver 1901, a controller (e.g., a processor) 1902, and a storage unit (e.g., a memory) 1903. The transceiver 1901, the controller 802, and the storage unit 1903 of the BS 1900 may operate according to at least one or a combination of methods corresponding to the aforementioned embodiments. However, the elements of the BS 1900 are not limited to the described examples. For example, the BS 1900 may include more or fewer elements compared to the aforementioned elements. In addition, the transceiver 1901, the controller 1902, and the storage unit 1903 may be implemented in the form of a single chip.

The transceiver 1901 may include a transmitter and a receiver according to an embodiment. The transceiver 1901 may transmit signals to or receive signals from a terminal. The signals transmitted to or received from the BS may include control information and data. The transceiver 1901 may include an RF transmitter configured to perform amplification and up-conversion of a frequency of a transmitted signal, and an RF receiver configured to perform low-noise amplification of a received signal and perform down-conversion of a frequency. The transceiver 1901 may receive a signal through a radio channel, output the signal to the controller 1902, and transmit, through the radio channel, a signal output from the controller 1902.

The controller 1902 may control a series of procedures so that the BS 1900 may operate according to the aforementioned embodiment of the disclosure. For example, the controller 1902 may perform or control a BS operation for performing at least one or a combination of methods according to the embodiments of the disclosure. The controller 1902 may include at least one processor. For example, the controller 1902 may include a communication processor configured to perform control for communication and an AP configured to control a higher layer (e.g., an application).

The storage unit 1903 may store control information (e.g., information on channel estimation, which is generated using DMRSs transmitted on a PUSCH determined by the terminal 1900) or data thereof, and control information or data received from a terminal, and may have an area for storing data required for controlling of the controller 1902 and data generated during controlling in the controller 1902.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

According to the above-described embodiments of the disclosure, a method is provided that is capable of solving a problem of excessive energy consumption and achieving high-energy efficiency, by defining a method for signal transmission by a BS in a wireless communication system.

Additionally disclosed is a method that is capable of solving a problem of excessive energy consumption and achieving high-energy efficiency, by defining a method for state and DTX configuration for energy saving by a BS in a wireless communication system.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A base station in a wireless communication system, the base station comprising:
   a transceiver; and
   a controller coupled with the transceiver, and configured to:
      transmit, to a user equipment (UE), via a radio resource control (RRC) signaling, configuration information configuring a discontinuous transmission (DTX) for a cell,
      transmit, to the UE, downlink control information (DCI) indicating an activation or deactivation of the configuration information configuring the DTX for the cell, and
      perform a DTX operation for the cell based on the configuration information and the DCI,
     wherein the DCI is based on a type3-physical downlink control channel (PDCCH) common search space (CSS), and
     wherein the DTX operation starts after a time gap from transmitting the DCI indicating the activation or deactivation of the configuration information.

2. The base station of claim 1, wherein the configuration information includes a first value indicating an on duration timer for an active duration of the DTX for the cell and a second value indicating a cycle of the DTX, and
     wherein the DTX operation for the cell includes a transmission of a PDCCH during the active duration.

3. A user equipment (UE) in a wireless communication system, the UE comprising:
   a transceiver; and
   a controller coupled with the transceiver, and configured to:
      receive, from a base station, via a radio resource control (RRC) signaling, configuration information configuring a discontinuous transmission (DTX) for a cell, and
      receive, from the base station, downlink control information (DCI) indicating an activation or deactivation of the configuration information configuring the DTX for the cell,
     wherein a DTX operation for the cell is performed based on the configuration information and the DCI,
     wherein the DCI is based on a type3-physical downlink control channel (PDCCH) common search space (CSS), and
     wherein the DTX operation starts after a time gap from transmitting the DCI indicating the activation or deactivation of the configuration information.

4. The UE of claim 3, wherein the configuration information includes a first value indicating an on duration timer for an active duration of the DTX for the cell and a second value indicating a cycle of the DTX, and wherein the DTX operation for the cell includes a transmission of a PDCCH during the active duration.

5. A method performed by a base station in a wireless communication system, the method comprising:

transmitting, to a user equipment (UE), via a radio resource control (RRC) signaling, configuration information configuring a discontinuous transmission (DTX) for a cell;

transmitting, to the UE, downlink control information (DCI) indicating an activation or deactivation of the configuration information configuring the DTX for the cell; and perform a DTX operation for the cell based on the configuration information and the DCI, wherein the DCI is based on a type3-physical downlink control channel (PDCCH) common search space (CSS), and wherein the DTX operation starts after a time gap from transmitting the DCI indicating the activation or deactivation of the configuration information.

6. The method of claim 5, wherein the configuration information includes a first value indicating an on duration timer for an active duration of the DTX for the cell and a second value indicating a cycle of the DTX, and wherein the DTX operation for the cell includes a transmission of a PDCCH during the active duration.

7. A method performed by a user equipment (UE) in a wireless communication system, the method comprising:

receiving, from a base station, via a radio resource control (RRC) signaling, configuration information configuring a discontinuous transmission (DTX) for a cell; and receiving, from the base station, downlink control information (DCI) indicating an activation or deactivation of the configuration information configuring the DTX for the cell, wherein a DTX operation for the cell is performed based on the configuration information and the DCI, wherein the DCI is based on a type3-physical downlink control channel (PDCCH) common search space (CSS), and wherein the DTX operation starts after a time gap from transmitting the DCI indicating the activation or deactivation of the configuration information.

8. The method of claim 7, wherein the configuration information includes a first value indicating an on duration timer for an active duration of the DTX for the cell and a second value indicating a cycle of the DTX, and wherein the DTX operation for the cell includes a transmission of a PDCCH during the active duration.

* * * * *